(12) United States Patent
Subramanian et al.

(10) Patent No.: US 7,254,649 B2
(45) Date of Patent: Aug. 7, 2007

(54) WIRELESS SPREAD SPECTRUM COMMUNICATION PLATFORM USING DYNAMICALLY RECONFIGURABLE LOGIC

(75) Inventors: Ravi Subramanian, Mountain View, CA (US); Uma Jha, Placentia, CA (US); Joel D. Medlock, Campbell, CA (US)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 11/198,692

(22) Filed: Aug. 5, 2005

(65) Prior Publication Data

US 2005/0282534 A1    Dec. 22, 2005

Related U.S. Application Data

(62) Division of application No. 09/772,584, filed on Jan. 29, 2001.

(60) Provisional application No. 60/178,828, filed on Jan. 28, 2000.

(51) Int. Cl.
   G06F 13/10   (2006.01)
   H04B 1/38    (2006.01)
(52) U.S. Cl. .................................... 710/8; 375/222
(58) Field of Classification Search ............... None
   See application file for complete search history.

(56) References Cited

U.S. PATENT DOCUMENTS

| | | | |
|---|---|---|---|
| 5,301,136 A | | 4/1994 | McMillan, Jr. et al. |
| 5,483,647 A | | 1/1996 | Yu et al. |
| 5,872,810 A | * | 2/1999 | Philips et al. ............... 375/222 |
| 5,999,990 A | * | 12/1999 | Sharrit et al. ................. 710/8 |
| 6,058,114 A | | 5/2000 | Sethuram et al. |
| 6,067,008 A | | 5/2000 | Smith |
| 6,072,490 A | | 6/2000 | Bates et al. |
| 6,072,994 A | * | 6/2000 | Phillips et al. ............... 455/84 |
| 6,128,639 A | | 10/2000 | Pase |
| 6,148,006 A | | 11/2000 | Dyke et al. |
| 6,167,525 A | | 12/2000 | Donazzi et al. |
| 6,237,054 B1 | | 5/2001 | Freitag, Jr. |

* cited by examiner

Primary Examiner—Ilwoo Park
(74) Attorney, Agent, or Firm—Dickstein, Shapiro, LLP.

(57) ABSTRACT

A wireless spread spectrum communication platform for processing a communication signal is disclosed herein. The wireless communication platform includes a first computing element, a second computing element, and a reconfigurable interconnect. The first computing element is coupled to the second computing element via the reconfigurable interconnect. A design configuration of the first computing element is heterogeneous with respect to a design configuration of the second computing element. The reconfigurable interconnect has an uncommitted architecture, thereby allowing it to be configured by an outside source to couple portions of the first reconfigurable interconnect with portions of the second reconfigurable interconnect in a variety of combinations. The first computing element, the second computing element, and the reconfigurable interconnect operable to perform discrete functions suitable for processing of the communication signal.

17 Claims, 18 Drawing Sheets

WIRELESS SPREAD SPECTRUM COMMUNICATION PLATFORM USING DYNAMICALLY RECONFIGURABLE LOGIC

CROSS-REFERENCE TO RELATED APPLICATIONS

This application claims priority to provisional patent application having Ser. No. 60/178,828 filed on Jan. 28, 2000, and to non-provisional patent application having Ser. No. 09/772,584 filed on Jan. 29, 2001.

MICROFICHE APPENDIX

A microfiche appendix entitled "Appendix B, Computer Program-Instructions," is included in the present application. The microfiche appendix includes 1 microfiche card.

TECHNICAL FIELD

The present claimed invention relates to the field of wireless communication. In particular, the present claimed invention relates to an apparatus and a method for processing digital signals in a wireless spread spectrum communication system.

BACKGROUND ART

Wireless communication has extensive applications in consumer and business markets. Among the many spread spectrum communication applications/systems are: fixed wireless, unlicensed (FCC) wireless, local area network (LAN), cordless telephony, personal base station, telemetry, mobile wireless, and other digital data processing applications. While each of these applications utilizes spread spectrum communications, they generally utilize unique and incompatible protocols for various signal processing operations, e.g., encoding, modulation, demodulation, and decoding, etc. These unique and incompatible protocols may require unique hardware, software, and methodologies for the communication protocol. This practice can be costly in terms of design, testing, manufacturing, and infrastructure resources. As a result, a need arises to overcome the limitations associated with the varied hardware, software, and methodology for processing digital signals in each of the varied spread spectrum wireless applications.

In contrast to the hardware and algorithmic variations in the spread spectrum wireless applications, they all share a common demand for increased capacity to accommodate new users that continues to grow at an enormous rate. Compounding this problem is the demand for new and more data-intensive forms of wireless communication, such as data transfer with networks, e.g., Internet data transmission. In contrast, the resources available to accommodate these demands, e.g., frequency bandwidth, are substantially limited. Consequently, a need arises for an apparatus and a method to effectively accommodate the increases in the quantity of users and the increase in the quantity of data transferred while using a limited frequency bandwidth.

Besides the variation between spread spectrum communication applications, substantial variations occur over time within a given spread spectrum communication application. For example, within the code division multiple access (CDMA) cellular spread spectrum wireless application, significant changes have occurred over time. These changes take the form of a proliferation of different versions and performance levels, e.g., Telecommunication Industry Association (TIA) Interim Standard-95 (IS-95), IS54B, IS36, CDMA TIA IS2000 and TIA IS 2000A, European Telecommunication Standards Institute (ETSI) wideband CDMA (WCDMA), Global System for mobile communications (GSM), ARIB WCDMA, 1Xtreme, GPRS, EDGE, etc. And the pace at which improvements and new standards arise is increasing as more industry resources are focused on the needs and opportunities in this wireless communication. Unfortunately, all these factors result in minimal uniformity around the world at any one given point in time. For example, different countries and different service providers frequently use systems that are uniquely dedicated to their specific version of a communication protocol. Consequently, a need arises for overcoming the limitations of protocol non-uniformity and proliferation within each of the spread spectrum wireless communication applications.

The proliferation of communication protocols generates yet other problems. For example, the cost of changing communication protocols or upgrading versions or performance levels within a communication protocol can be significant. That is, handset and base station designers frequently improve the signal processing algorithms and processes to improve service. Given the high quantity of base stations, as. Well as user handsets, even a small unit cost for a change can multiply into a very large cost for the entire system. These costs are most pronounced when a hardware change or when on-site field reprogramming is required. Furthermore, a software or hardware change for a new version or performance level may hinder the efficiency of the existing device configuration due to incompatibility, etc. Consequently, a need arises to overcome the limitations of cost and resource-intensive changes in versions or performance levels of a communication protocol.

Changes in performance level or versions of a communication protocol can also affect the network services and coverage, and hence the survival of a wireless service provider or a hardware manufacturer. For example, given the long lead time and the investment required for designing, manufacturing, and installing an infrastructure for a given communication protocol, a future but uncertain specification can be a tremendous risk. This is especially so with an application specific integrated circuit (ASIC) device whose configuration is defined primarily by fixed hardware. However, market rewards may be significant for the service provider or manufacture that is able to realize the new protocol in the shortest possible time. Thus, a risk versus reward tradeoff exists with implementing new communication protocols. Given the degree of the risks and promise of rewards, a need arises to overcome the limitations of the long lead-time and the investment required for implementing a new specification.

With the increased sophistication of each new generation of communication device, power consumption remains a significant issue. Among other things, power consumption affects: battery life for handheld devices; cooling systems required for base stations; durability and reliability of semiconductor devices and integrated circuits; and other performance criteria. Conventional alternatives to hardwired ASICs have significant power consumption issues that offset their benefits. Consequently, a need arises to overcome the limitations in power consumption for a communication device.

SUMMARY OF THE INVENTION

The present invention provides a method and apparatus that can effectively accommodate the increases in the quantity of users and the quantity of data transferred using the limited frequency bandwidth. Furthermore the present invention provides a solution that overcomes the limitations of protocol non-uniformity and proliferation in the wireless communications. The limitations of cost and burden associated with changes in versions or performance levels of a communication protocol are also resolved by the present invention. In an effort to minimize the risks and maximize the rewards, the present invention substantially shortens the lead-time and the investment required for implementing a new specification. Finally, the present invention provides reasonable power consumption for the communication device.

In particular, the present invention provides an apparatus and method that can flexibly and efficiently process data. One embodiment of the present invention is a processor with an architecture that includes a first computing element, a second computing element, and a reconfigurable interconnect. The first computing element is coupled to the second computing element via the reconfigurable interconnect. The first computing element performs a discrete operation, or portion thereof in an application, while the second computing element performs another discrete operation, or portion thereof for the application. The reconfigurable interconnect has an uncommitted architecture, thereby allowing it to be configured by an outside source to couple portions of the first reconfigurable interconnect with portions of the second reconfigurable interconnect in any combination. The first computing element, the second computing element, and the reconfigurable interconnect operable to perform a class of functions suitable for processing the communication signal.

A second embodiment of the present invention provides a convenient method for operating the functional kernels having reconfigurable hardware to a configuration for implementing wireless communication. In a first step of the process, a signal to be processed is received at a reconfigurable modem platform having a heterogeneous multiprocessor architecture. Next, the signal is assigned to a data pump path in the reconfigurable modem platform. Then, design configuration information for the reconfigurable modem platform is received. Finally, the data portion of the signal undergoes digital signal processing using the reconfigurable modem platform.

These and other objects and advantages of the present invention will become apparent to those of ordinary skill in the art after having read the following detailed description of the preferred embodiments, which are also illustrated in the various drawing figures.

BRIEF DESCRIPTION OF THE DRAWINGS

The drawings included herewith are incorporated in and form a part of this specification. The drawings illustrate embodiments of the invention and, together with the description, serve to explain the principles of the invention. It should be understood that the drawings referred to in this description are not drawn to scale unless specifically noted as such.

DETAILED DESCRIPTION OF THE INVENTION

Figure 1A:
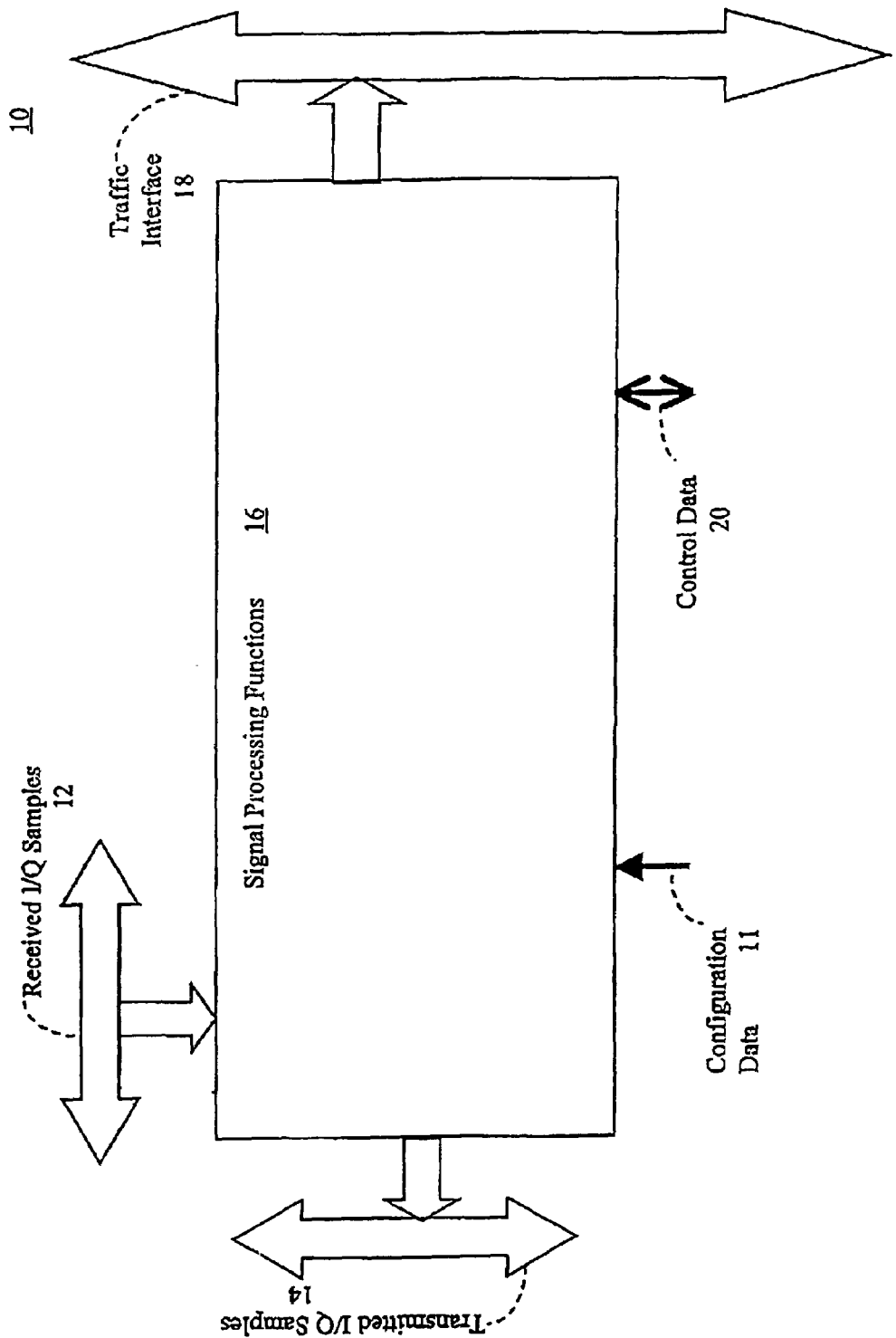
FIG. 1A is a block diagram of the interface functions accommodated by the electronic spread spectrum communication device, in accordance with one embodiment of the present invention.

Reference will now be made in detail to the preferred embodiments of the invention. Examples of the preferred embodiment are illustrated in the accompanying drawings. While the invention will be described in conjunction with the preferred embodiments, it is understood that they are not intended to limit the invention to these embodiments. Rather, the invention is intended to cover alternatives, modifications and equivalents, which may be included within the spirit and scope of the invention, as defined by the appended claims. Additionally, in the following detailed description of the present invention, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

The present invention can be implemented in a wide variety of digital spread-spectrum wireless communication systems or techniques that utilize code sequences. Code sequences are utilized in wireless communications for many functions including, but not limited to: filtering, searching, modulation, and demodulation. The systems or techniques which utilize code sequences include, but are not limited to, fixed wireless, unlicensed Federal Communications Commission (FCC) wireless systems, wireless local area network (W-LAN), cordless telephony, cellular telephony, personal base station, telemetry, and other digital data processing applications. The present invention can be applied to both transmitters, e.g., a base station, and to receivers, e.g., a terminal, for fixed wireless, W-LAN, cellular telephony, and personal base station applications.

In particular, one fixed wireless application to which the present invention may be applied is a metropolitan multi-point distribution system (MMDS). Examples include wireless cable broadcast, or two-way wireless local loop (WLL) systems. Some examples of a W-LAN, that can communicates digitized audio and data packets, for which the present invention can be applied include Open Air, and the Institute of Electrical and Electronics Engineers (IEEE) specification 802.11 b. In yet another application, a specific example of unlicensed FCC applications to which the present invention may be applied includes the Industrial, Scientific, and Medical band (ISM) devices, which can include cordless telephony products. Personal base stations can utilize either cordless or cellular telephony wireless communication standards. Lastly, the cellular telephony systems in which the present invention can be applied includes, but is not limited to, IS-95, IS2000, ARIB, 3GPP-FDD, 3GPP-TDD, 3GPP2, 1Xtreme, or other user-defined protocols. The range of code sequences utilized in the exemplary spread spectrum applications disclosed herein, are useful to define the class of functions for which the present configurable code generator unit is applicable.

The detailed description of the present invention begins with a description of an exemplary application, a spread-spectrum communication device, in FIGS. 1A through 1D. In particular, spread spectrum communication device is described in FIG. 1A in terms of a functional block diagram, in FIGS. 1B and 1C in terms of hardware block diagrams, and in FIG. 1D as a block diagram of a virtual machine interface (VMI) that translates user-desired functions to device-level instructions using resident hardware and software. Next, FIGS. 2A through 2F describe a configurable processor, and its configurable hardware kernel components, in an increasingly detailed manner. A functional block diagram of a configurable hardware kernel is presented in FIG. 2F. Thereafter, the functional layout of hardware kernels in a configurable modem processor for the exemplary spread-spectrum communication device is provided in FIGS. 3A through 3D for modem functions, and in FIG. 4 for codec functions. FIG. 5 provides a diagram of function management technique utilized by processors with configurable hardware kernels. Lastly, various processes associated with the communication device and the hardware kernels are described in FIGS. 6A through 6C.

Communication Device

Referring now to FIG. 1A, a block diagram 10 of the interface functions accommodated by the electronic spread spectrum communication device are shown, in accordance with one embodiment of the present invention. The signal processing functions 16 shown have a configurable architecture in one embodiment that enables an electronic spread spectrum communication device to operate using a wide variety of communication protocols, including CDMA, 3GPP, TDMA, as well as anticipated future protocols. Block diagram 10 provides a macro level description of the interface functions. A more detailed description of the specific sub-functions and operations, and the hardware that implements them are provided in subsequent figures herein.

The signal processing function block 16 of a communication device is responsible for performing the data processing steps needed to convert a received signal into meaningful data for an end user and to convert an input from a user and convert it to a transmittable signal. Within signal processing function block 16, a wide variety of functions, sub functions, and operations are performed to satiate the requirements of the specific communication protocol chosen for a communication device. For example signal-processing functions can include demodulation and/or decoding for received in-phase and quadrature-phase (I/Q) samples 12, and include encoding and/or modulation for transmitted I/Q samples 14. Control data 20 provides the necessary control information, e.g., flags, handshakes, addressing, status, etc., to components such that signal processing functions 16 can be accomplished. Signal processing function block 16 also communicates with a traffic interface 18, to accommodate the allocation of respective signals to each of the many different wireless users operating within a given communication system. In the present embodiment, the traffic interface is a mobile telephone switching office (MTSO) for a cellular spread spectrum communication application. However, another spread spectrum communication application may not require a traffic interface, e.g., a cordless telephony spread spectrum application. Processing function block 16 receives I/Q samples 12 upon which known data processing protocols are implemented. Similarly, processing function block 16 transmits desired data as I/Q samples 14 to another communication device (not shown). Configuration data 11 inputs provides the necessary information to configure the hardware and software components used to implement signal-processing function block 16.

Figure 1B:
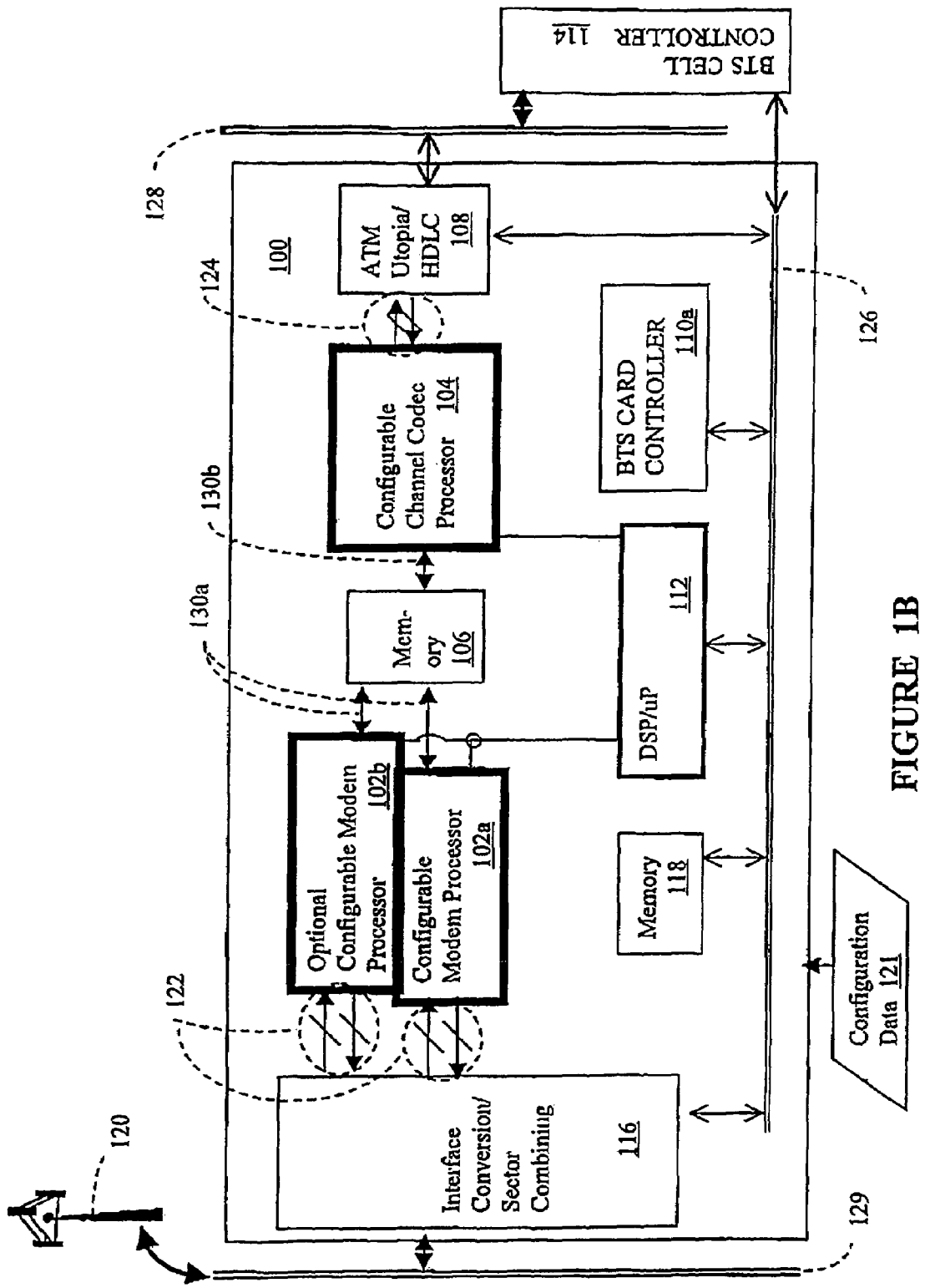
FIG. 1B is a block diagram of an electronic spread spectrum communication device having heterogeneous multiprocessor components, in accordance with one embodiment of the present invention.

Referring now to FIG. 1B, a block diagram of an electronic spread spectrum communication device having heterogeneous multiprocessor components for processing data is shown, in accordance with one embodiment of the present invention. Electronic spread spectrum communication device 100 includes subcomponents and configurations that are illustrated and described in more detail in subsequent figures. Additionally, electronic spread spectrum communication device 100 also employs methodology for design, configuration, and operation that will be described in subsequent flowchart figures. While electronic spread spectrum communication device 100 is a base transceiver station (BTS) in the present embodiment, the present invention is well suited to electronic spread spectrum communication device 100 being a mobile handset or a test equipment platform.

Electronic spread spectrum communication device 100 includes an interface conversion block 116, a modulator/demodulator (modem) processor 102a, an optional configurable modem processor 102b, memory 106 and 118, a processor 112, a channel coder/decoder (codec) processor 104, a base transceiver station (BTS) card controller 110a, and an ATM Utopia/HDLC 108. Processor 112 can either be a digital signal processor (DSP) or general-purpose microprocessor (GP uP). External memory 106 used for interleaving meets the following requirements for the present embodiment: 1) 8 Mb SRAM; 2) 18 MHz Performance; 3) Minimum 512K×16 configuration; 4) Byte write-enables. However the present invention is well suited to alternative memory configurations, tailored for a given spread spectrum application.

In the present embodiment, configurable modem processor 102a, optional configurable modem processor 102b, and configurable channel codec processor 104 have a configurable heterogeneous multiprocessor architecture. Thus, configurable modem processor block 102a and configurable codec processor 104 can be configured to operate a wide range of spread spectrum communication protocols, e.g., the exemplary spread spectrum protocols described hereinabove. To do so, configurable modem processor 102a and configurable codec processor 104 are designed with a sufficiently wide scope to accommodate the common and unique requirements of these varied spread spectrum communication protocols. Subsequently, the configurable modem processor 102a and the configurable codec processor 104 are provided with the instructions and data necessary to configure them, e.g., configuration input 121, to a single desired spread spectrum protocol. Notably, the configurable modem processor 102a and the configurable codec processor 104 can subsequently be reconfigured to another spread spectrum protocol within the design scope. The hardware, software, and processes used to implement this configuration are described in subsequent figures. The specific structure, components, functions, and processes utilized for the present invention will be described in more detail if subsequent hardware, function, and flowchart diagrams. This architecture provides electronic spread spectrum communication device 100 with a flexible configuration that can accommodate a wide range of spread spectrum communication applications while simultaneously providing energy efficient operation. Thus the present invention overcomes the trade-offs associated with prior art configurations, wherein a device was flexible but energy inefficient, or the device was energy inefficient but inflexible.

Configurable modem processor block 102a includes at least one hardware kernel plane in the present embodiment. The hardware kernel plane, described in subsequent figures, is a reconfigurable collection of multiple algorithmic-specific processors. The hardware kernel plane can implement the sub functions of a functional kernel plane, described in a subsequent figure. In the present embodiment, Configurable modem processor block 102a can be designed to accommodate multiple channels of data, the specific number depending upon the needs of a specific application.

Channel codec functions are implemented by exemplary CODEC signal processor 104 of FIG. 1B, which is a reconfigurable multi-channel digital channel encoder-decoder chip that performs convolution, iterative turbo decoding, rate-detection, and rate matching functions for a wide range of quantities of voice channels. Channel codec functions also implemented by channel codec signal processor 104 for transmission encoding include convolution and turbo coder functions, puncturing, rate-matching, and interleaving on the transmit path, in the present embodiment.

By using a heterogeneous reconfigurable architecture together with application-specific kernels, as described hereinafter, a programmable and configurable signal-processing platform is realized. These configurations are completely under the control of the communication systems designer, and are described in detail in a subsequent flowchart. The architecture of the Channel Codec Signal Processor 104 of FIG. 1B provides a very high level of integration, while allowing the communication systems designer to employ proprietary techniques to improve decoder performance in each of the stages described above. The architecture of the Channel Codec Signal Processor 104 enables the system designer to program the chip at many levels, including control of specific datapaths to realize different algorithms. Details on the architecture and operation of codec processor are given in subsequent block diagram figures and in flowchart figures.

Interface conversion block 116 is coupled to the antenna bus 129, which is in turn coupled to an antenna, e.g., a BTS antenna 120, which can include multiple antennae in one embodiment. Interface conversion block 116 is also coupled to configurable modem processor 102a and to optional configurable modem processor 102b via bus 122, respectively. Bus 122 can be separate independent non-shared buses, or a single shared bus. Interface conversion block 116 includes components (not shown) such as a radio frequency (RF) transceiver and an analog to digital (A/D) converter coupled to each other in series, whose subcomponents and functions are known to those skilled in the art. Configurable modem processor 102a and optional configurable modem processor 102b are coupled to a processor 112 and to memory 106, which is random access memory (RAM) in the present embodiment. Memory 106 is coupled to channel codec processor 104, which in turn is coupled to ATM Utopia/HDLC 108 via bus 124. An internal data/control bus 126 is coupled to interface conversion block 116, memory 118, processor 112, BTS card controller 110a, and to ATM Utopia/HDLC 108 in order to pass data and control instructions between these components. ATM Utopia/HDLC 108 is a conventional asynchronous transfer mode (ATM) networking interface in the present embodiment.

In one embodiment, uP 112 is a general-purpose microprocessor capable of performing the functions of BTS card controller 110a. An external BTS cell controller 114 is coupled to internal bus 126 and to a mobile telephone switching office bus 128. ATM Utopia/HDLC 108 provides signal formatting, memory, and interface circuits for Operations and Maintenance (OAM) control. BTS Cell Controller 114 determines the personality (or radio configuration) of each channel element by loading specific configuration software into specific control registers in BTS Channel Card Controller 110a, processor 112, configurable modem processor 102a, and codec processor 104. Interface configurations and protocols are described in FIG. 1C.

By using processor 112 in communication device 100, the present invention provides the ability to use existing digital signal processing resources, while upgrading other processing resources to more flexible and efficient hardware, e.g., configurable modem processor 102a. In particular, functions that were performed on general-purpose processors are performed by the present invention on operation-specific, or algorithmic-specific, processors that are interconnected to realize a modem or codec function. Furthermore, the operation-specific processors possess the appropriate amount of configurabilitiy for protocol variations, thereby providing robustness for future developments. By providing configurabiltiy, the present invention provides a communication device with the flexibility to operate under a wide range of communication protocols, such as IS-95, CDMA-2000, 3GPP, and time-division multiple access (TDMA), to name a few.

Electronic spread spectrum communication device 100 is responsible for processing voice, data, and control signals in a transmission and reception mode. In pursuit of these functions, BTS card controller 110a provides a number of interfaces. In the present embodiment, BTS card controller 110a provides: 1) antenna receive (RX) Bus 129 to receive the uplink digitized signal samples; 2) BTS Cell Controller for sending and receiving control information associated with call setup, teardown, and handoff; and 3) Operations and Maintenance (OAM) Monitor for performance analysis, reconfiguration over the network based on system planning, and troubleshooting.

Alternative components and configurations to communication device 100 are compatible with the present invention. For example, bus 126 provides an exemplary coupling configuration of components in electronic spread spectrum communication device 100. It is appreciated by those skilled in the art that bus 126 can include subcomponents of specific control/status/data lines for communication between appropriate devices. It is further appreciated by those skilled in the art that bus 126 can be a parallel configuration or serial configuration with multiplexing. Furthermore, bus 126 can have interconnects and translators, as appropriate for a given application. These alternatives are also suitable for buses 129, 128, 127, 130, 122, and 122a, and other buses that can be used to couple components in communication devices 100 and 101 of FIGS. 1B and 1C, respectively.

Additionally, communication device 100 is well suited to alternative components and coupling configurations of memory 106. For example, while memory 106 is located between configurable modem processor 102a, and channel codec processor 104 in the present embodiment, the present invention is well suited to coupling configurable modem processor 102a directly to channel codec processor 104 and to locating memory 106 directly adjacent to channel codec processor 104. While memory 106 and 118 are specified as RAM in the present embodiment, the present invention is well suited to a wide range of memory configurations, such as ROM, registers, flash memory, etc. While antenna 120 is shown as a BTS antenna having multiple individual antennae arranged in sectors, the present invention is well suited to antenna 120 be a single or dual antennae for a mobile handset or a test platform application.

While the present embodiment provides both a configurable modem processor 102a and a configurable codec processor 104 in communication device 100, the present invention is well suited to an alternative configuration that uses a configurable modem processor 102a with a conventional codec processor (e.g., a digital signal processor), and to using a configurable codec processor 104 with a conventional configurable modem processor. Lastly, while the present invention provides a single modem processor, with a single optional configurable modem processor 102b, the present invention is modular, and thus is well suited to using a wide range of processor types and quantities, as appropriate for a given spread spectrum application. Communication device can also include a configuration that accommodates multiple communication standards. For example, the present invention can be applied to communication protocols such as orthogonal frequency division multiplexing (OFDM). More detail is provided in a commonly assigned and related application, which is incorporated herein by reference and entitled "METHOD AND APPARATUS TO SUPPORT MULTI STANDARD, MULTI SERVICE BASE-STATIONS FOR WIRELESS VOICE AND DATA NETWORKS," U.S. patent application Ser. No. 09/752,050, filed on Dec. 29, 2000.

Figure 1C:
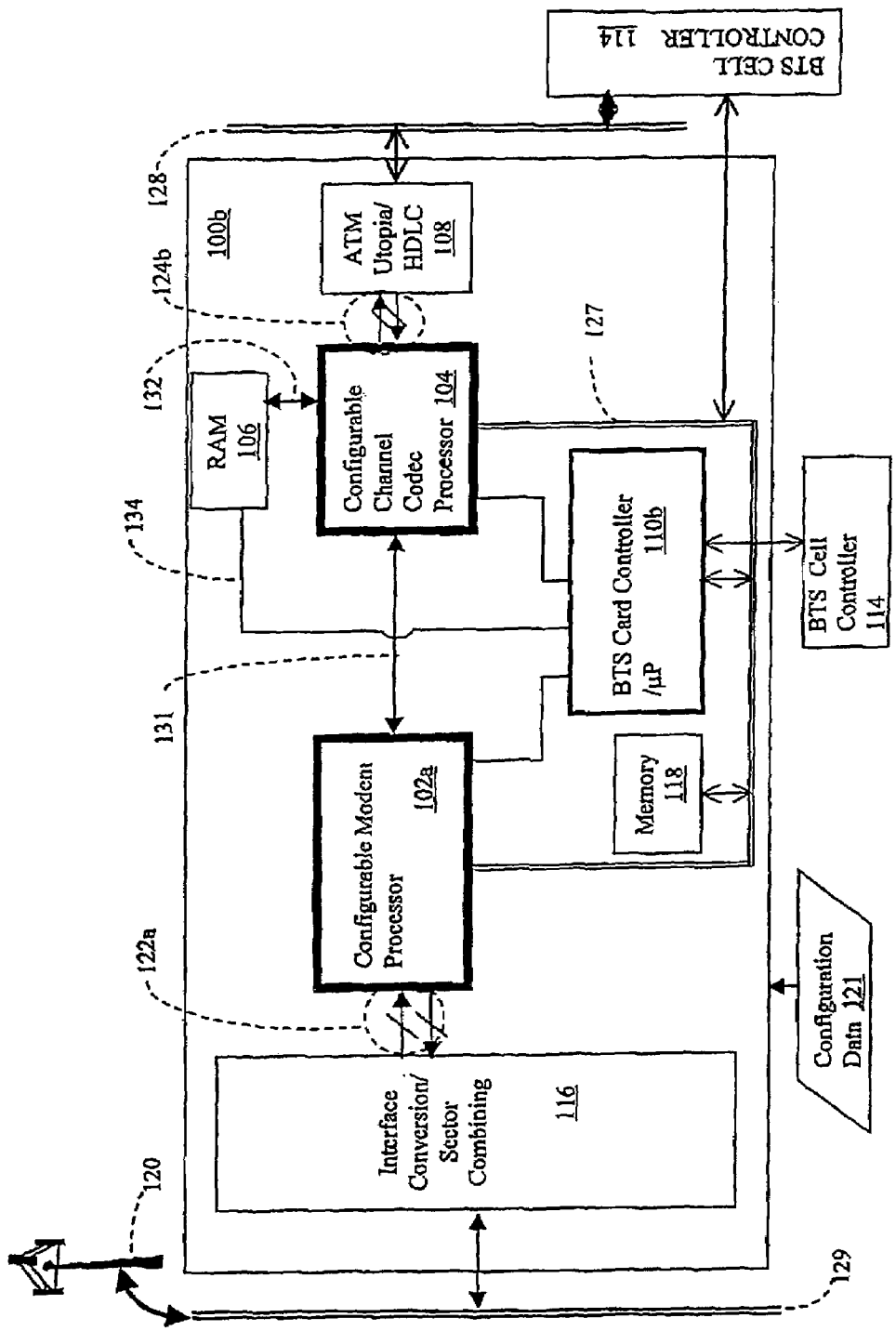
FIG. 1C is a block diagram of another configuration of an electronic spread spectrum communication device having heterogeneous multiprocessor components, in accordance with one embodiment of the present invention.

Referring now to FIG. 1C, a block diagram of another configuration of an electronic spread spectrum communication device having heterogeneous multiprocessor components is shown, in accordance with one embodiment of the present invention. Second configuration 101 of electronic spread spectrum communication device has many components and configurations that are similar to those shown in FIG. 1B. Thus, components and coupling configurations different from FIG. 1C are primarily discussed hereinafter.

Communication device 101 includes a BTS card controller 110b that can be a state machine or an optional microprocessor. Bus 127 couples memory 118 and BTS card controller 110b to channel codec processor 104 and configurable modem processor 102a. This provides a more direct data route between memory 118 and configurable modem processor 102a and channel codec processor 104. Additionally, memory 106 is located adjacent to channel codec processor 104, and coupled to BTS card controller 110b, and provides improved communication and processing to channel codec processor 104. It also provides improved communication and processing between channel codec processor 104 and modem processor 102a. While only one configurable modem processor 102a is shown in FIG. 1C, communication device 101 is well suited to using more than one configurable modem processor, as appropriate by a given application. Communication device 101 does not have a separate conventional DSP chip like communication device 100. Rather, communication device 101 utilizes either an external general purpose microprocessor 103 or utilizes computing elements within configurable modem processor 102a and channel codec processor 104 to perform functions traditionally provided by a conventional DSP chip. The alternative configurations and components discussed for communication device 100 are likewise applicable to communication device 101.

Interface configurations and protocol are utilized between components within communication device 100 and 101 as well as between components within and outside of communication device 100 and 101. For example, a bus interface 130a and 131 of communication device 100 and 101, respectively, is provided for streaming the received, coded symbols from the modem Signal Processor 102a and/or 102b to the Channel Codec Signal Processor 104. Similarly, bus interface 131 is provided for streaming the encoded transmit data from Channel Codec Signal Processor 104 into the modem signal processor 102a-102b (assumed to be interleaved on Channel Codec Signal Processor). Busses 130a and 130b of FIG. 1B and bus 131 of FIG. 1C combine a hand-shaking mechanism with a well-defined data stream in order to provide necessary flexibility in programming. Interface conversion/sector combining block 116 provides a high-speed parallel interface for communicating digitized I/Q samples between the Modem Signal processors 102a and 102b, and antenna 120, for an uplink or downlink embodiment. Two parallel ports 122 (one for I/Q uplink, one for I/Q downlink) are provided for multiplexed interface to multiple antennae, e.g. in antenna array 120 for a base station in the present embodiment. Memory interface 132 is provided for interfacing to an external SRAM 106 for support of necessary deinterleaving required for high data rate support. The interface assumes that a single memory resource may be shared across multiple modem signal processor implementations 102a (up to three modem signal processor's per memory), so that semaphores are required for coordinating, via input 134 from BTS card controller 110b, the necessary memory writes and establishing a single modem signal processor as the Burst Controller for frame bursts out of the Deinterleaver memory. A well-defined memory map within memory 106 is used to avoid fragmentation across external memory 106.

The functions and interfaces shown in FIG. 1A are implemented, in one embodiment, using hardware shown in FIGS. 1B-1C, and using subcomponents described in subsequent figures. For example, received I/Q samples 12 are provided to signal processing function block 16, via bus 129 of FIG. 1B in the present embodiment. Similarly, the signal processing functions required for an application are performed by communication device 100 of FIG. 1B or device 101 of FIG. 1C. Thus, for example, transmitted I/Q samples 14 and received I/Q samples can be communicated via bus 129 to/from antenna 120. Traffic interface 18 is accommodated via bus 128, and control data 20 is accommodated via bus 126, in one embodiment. While the functions described are attributed to a base transceiver station (BTS), the present invention is well suited to implementing the functions and appropriate interfaces on a mobile handset. For example, a mobile handset would not have an MTSO traffic interface, but would include the balance of the interfaces and functionality of FIG. 1A. While the present embodiment only describes configurable processors for two function types, e.g., modem and codec functions, and applies them to a wireless communication application, the present invention is well suited to accommodating other functions for other applications in a similar manner.

Figure 1D:
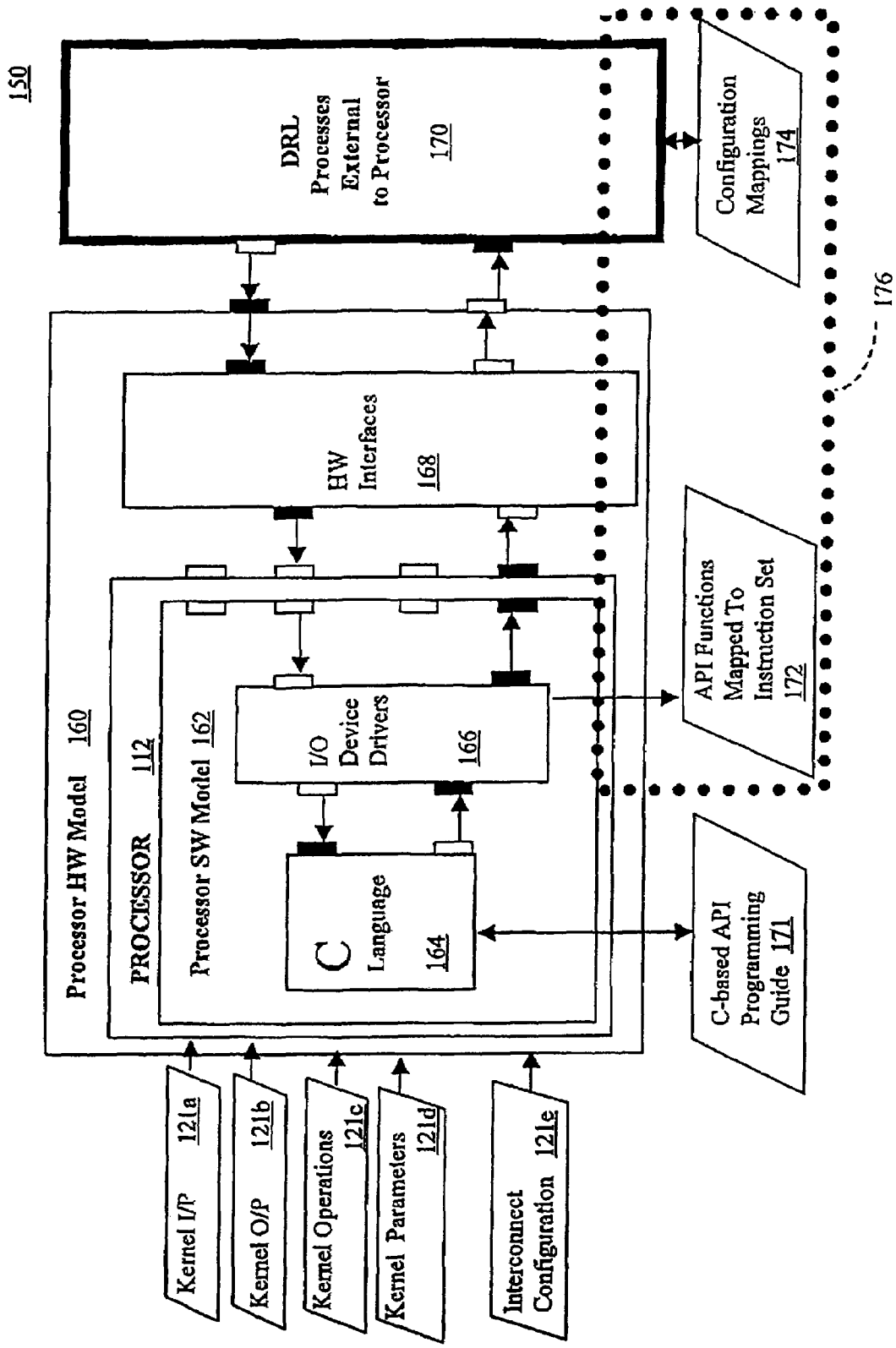
FIG. 1D is a block diagram of an electronic system used to interface a user with a configurable multiprocessor device, in accordance with one embodiment of the present invention.

Referring now to FIG. 1D, a functional block diagram 150 of a system used to interface a host-processor containing a user's program of configurations with a configurable multiprocessor device is shown, in accordance with one embodiment of the present invention. The configurable components, e.g., hardware kernels and interconnect of FIG. 2C, for communication device 100 can be programmed by user-defined configurations. The user-defined configurations can be generated by a user from a host microprocessor, e.g., a workstation, which implements a programming interface (API).

Processor hardware (HW) model 160 is a block diagram representing the interaction of hardware, e.g., a processor 112, with software and data such as library functions, instructions, and configuration data, that is stored in memory. Processor software model can be programmed with a virtual machine interface (VMI) in one embodiment. Specifically, processor 112 can be modeled as a software model consisting of user's C-language code (or software) 164 and I/O device drivers 166. The user provided C-language software 164 in order to configure configurable processes 170 of the configurable modem 102a and 102b, and of the configurable coded 104. C-language software 164 includes resident user-implemented C language block of instructions and functions that interface with input/output (I/O) driver block 166. C language block 164 is coupled to receive C-based application programming interface (API) programming guide data 171, which includes a library of functions for programming configuration inputs 121a through 121e to appropriate configuration mappings. Similarly, processor software model 162 is coupled to receive input 172 of API functions mapped to instruction set 171 and 172. Each API function of input 172 includes a set of instructions which will: 1) map the API function to a specific hardware kernel and reconfigurable interconnect (e.g. DRL) process; 2) describe the DRL process as a set of data structures/configuration signals that are passed via hardware interfaces 168 by host processor 112. API Programming Guide 171 serves as a reference to access the modes of flexibility in the modem signal processor.

Hardware interfaces block 168 is coupled to processor 112 to receive device driver information appropriate for the configuration input 121a through 121e. In turn, hardware interfaces block 168 is coupled to provide configuration instructions and data, e.g., driver information, to dynamically reconfigurable logic (DRL) block 170. DRL processes block 170 represents the ultimate desired processes (or functions) to be implemented by the configurable communication device, e.g., device 100 of FIG. 1B. DRL processes block can communicate configuration mapping data 174 to appropriate configurable components, described in subsequent FIGS. 2A through 2G, of configurable communication device 100, which can store and transmit instruction sets of mapped API functions.

Figure 2A:
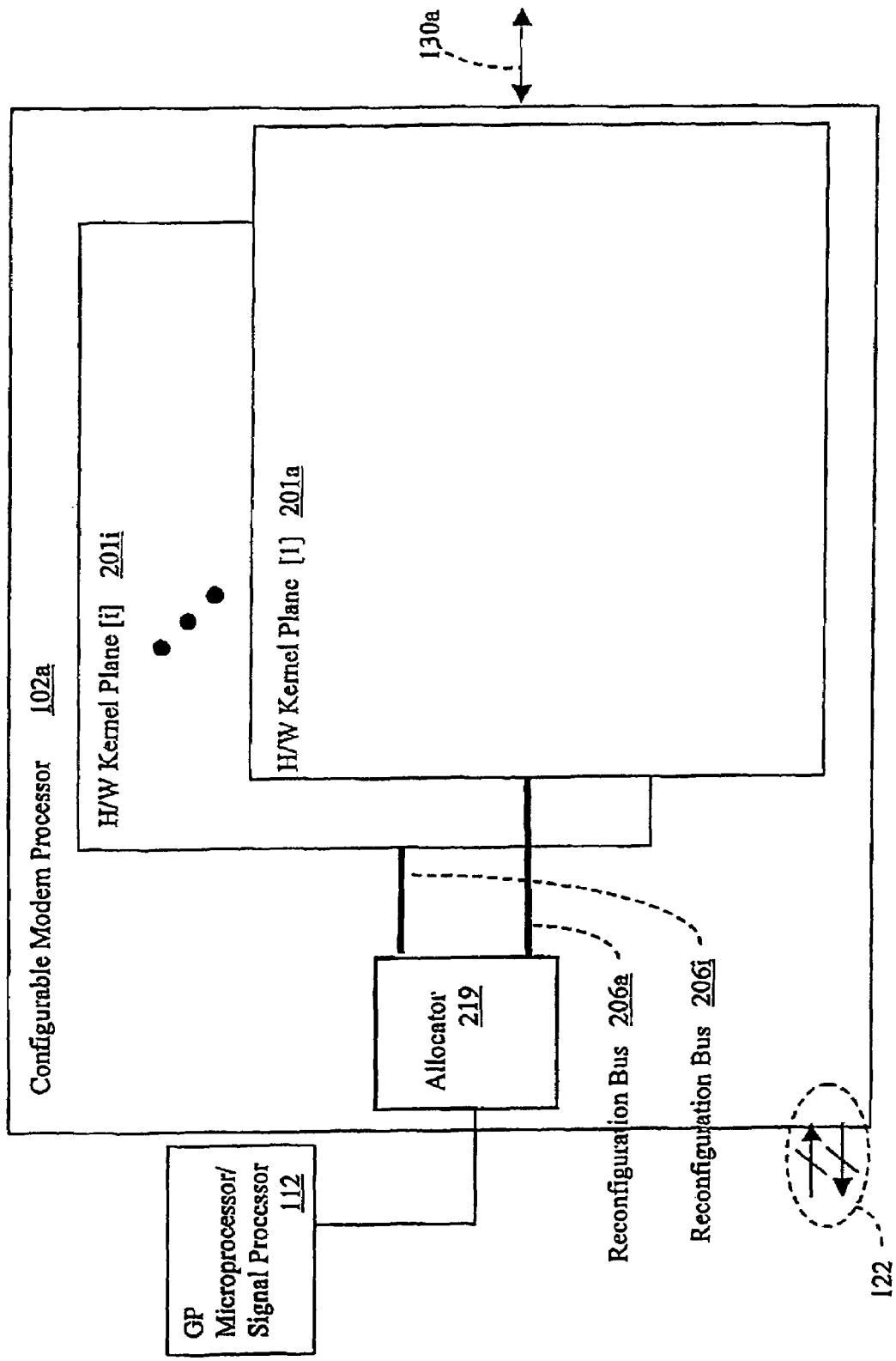
FIG. 2A is a block diagram of a processor having multiple configurable hardware kernel planes used in the electronic spread spectrum communication device, in accordance with one embodiment of the present invention.
Figure 2B:
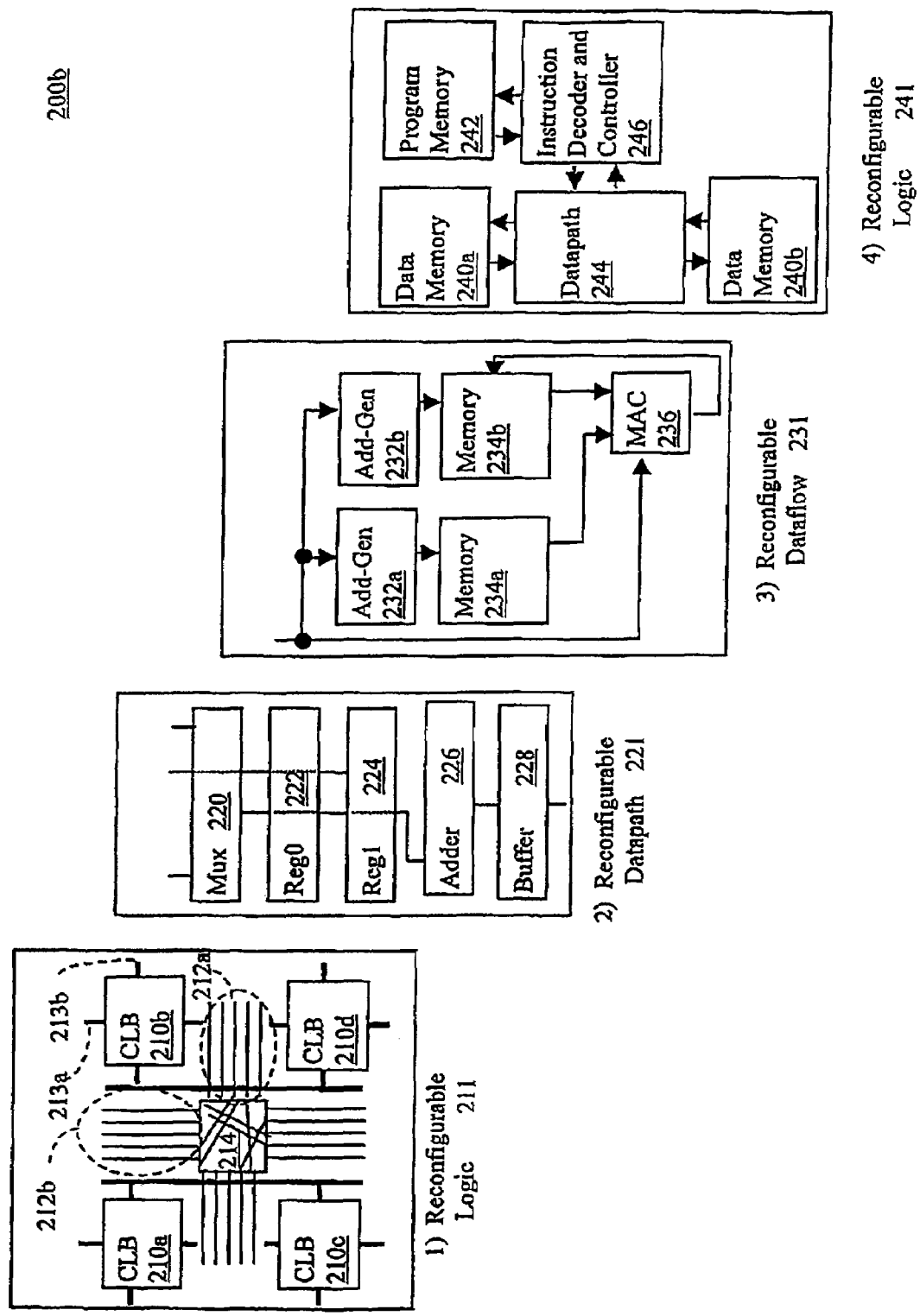
FIG. 2B is a block diagram of multiple possible architecture techniques used in the algorithmic satellite kernel portion of the hardware kernel, in accordance with one embodiment of the present invention.
Figure 2C:
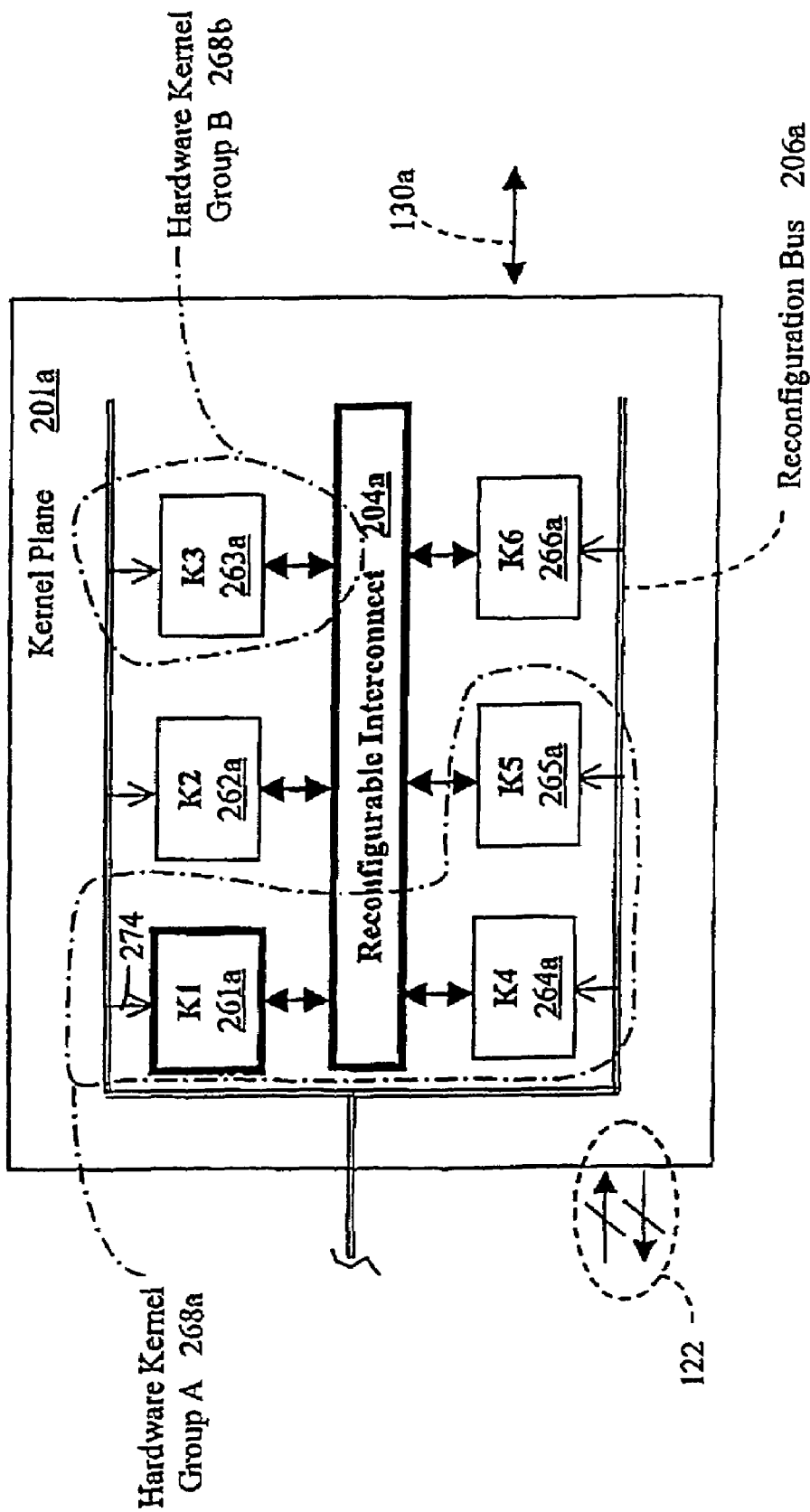
FIG. 2C is a block diagram of a configurable hardware kernel plane, in accordance with one embodiment of the present invention.
Figure 2D:
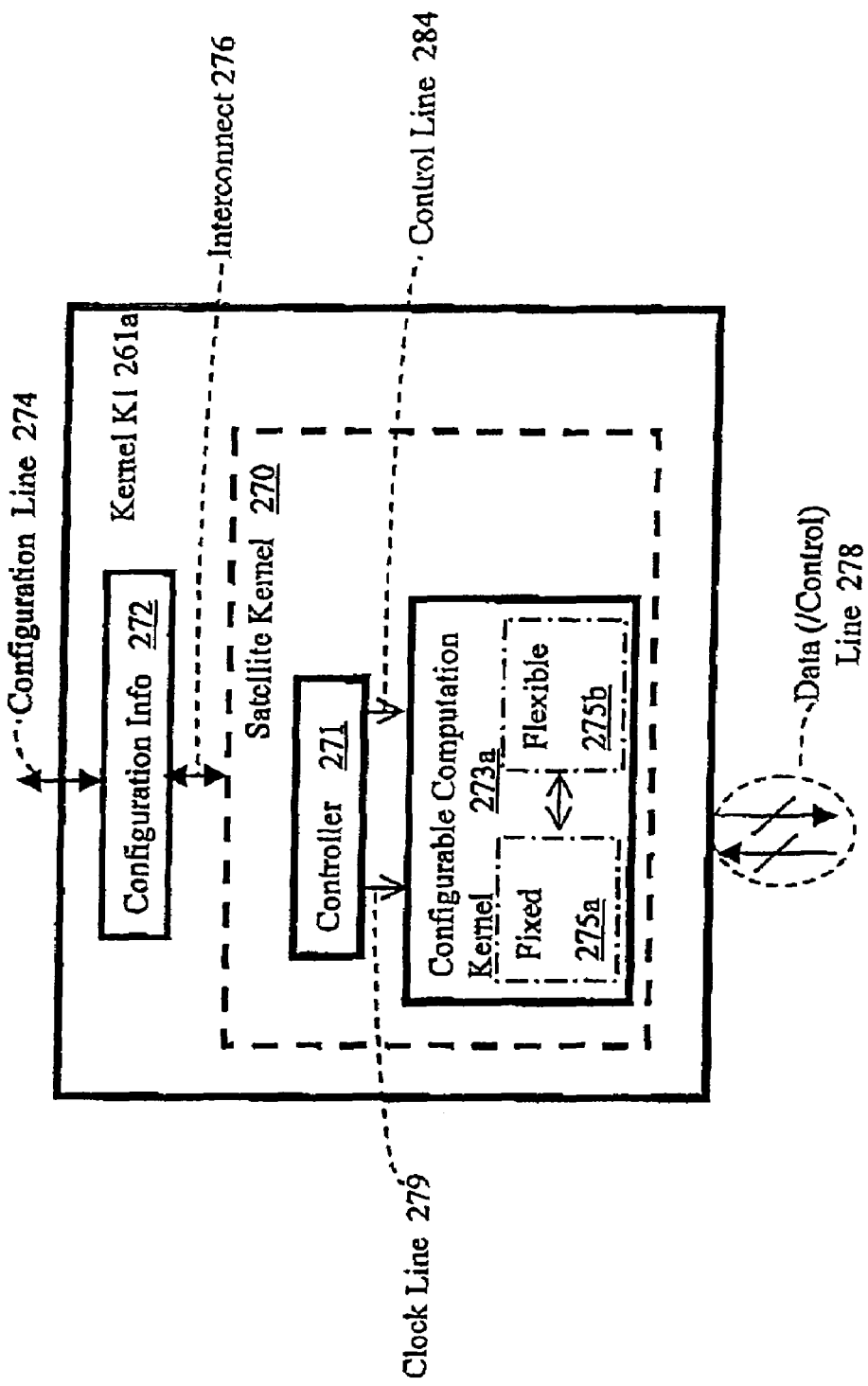
FIG. 2D is a block diagram of a kernel portion of a hardware kernel plane, in accordance with one embodiment of the present invention.
Figure 2E:
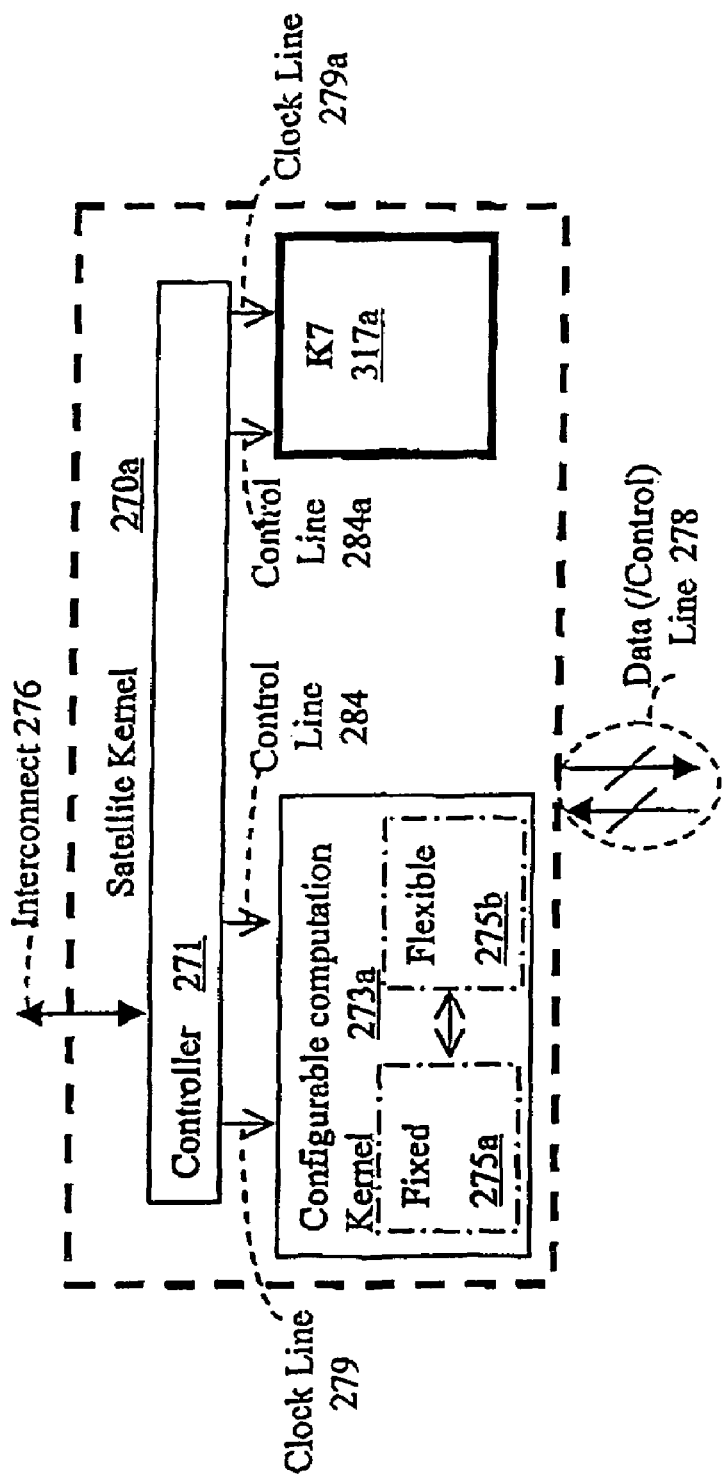
FIG. 2E is a block diagram of a hardware kernel containing a subcomponent hardware kernel, in accordance with one embodiment of the present invention.

User-implemented C-language block 164 provides a user with the ability to control the configuration of a hardware kernel, described in subsequent FIGS. 2C through 2E. In particular, the programmer/user can provide the following inputs to define the configuration of a configurable hardware kernel: 1) inputs, as shown by input 121a; 2) outputs, as shown by input 121b; 3) operation(s) to be performed, as shown by input 121c; 4) parameters, as shown by input 121d; 5) a type of arithmetic in a processing unit (e.g., dataflow process); and 6) type of state machines controlling the dataflow process (e.g., controlflow process) as shown by input 121e. In addition, user-implemented C-language block 164, provides a user with the ability to control the reconfigurable interconnect that link multiple hardware kernels within a kernel plane. Thus, input 121e includes user-specified interconnect configurations (i.e. interconnect reconfigurability). The present invention is well suited to using less inputs and control or providing additional inputs or control for a user to configure a configurable device.

Interconnect configuration input 121e specifies the configuration of reconfigurable interconnect such that a cluster(s) of kernels may be built. This level of control with individual kernels and the interconnect offers substantially greater flexibility than that of hardwired or parameterized application specific integrated circuit (ASIC) solutions. By using kernels that are focused to the specific types of data processing found in terrestrial and wireless communication applications, the computational efficiency, in millions of operations per milliwatt (MOPS/mW) of this architecture approaches that of an ASIC.

Functional block diagram 150 shows the hierarchy with which a user may interface DRL processes block 170. That is, the hierarchy includes: a) a first level with a C-based interface 164 with a user; b) a second level with an I/O device driver 166 interface between the C-language and the hardware interfaces; c) a third level with hardware interface block 168 that interfaces between the DRL process 170 and the processor HW model 160. Thus, the present embodiment utilizes a hierarchical Application Programming Interface (API) that supports several levels of user control for programming a Channel Codec Signal Processor, e.g., codec processor 104, or a configurable modem processor 102a, as shown in FIG. 1B. Dashed box 176 includes the API functions mapped to instruction set data 172, and the configuration mappings data 174. Dashed block 176 indicates the control software, which includes a subset of functions defined by the API. The control software block 176 enables the function of the configurable communication device, e.g., device 100 of FIG. 1B.

C-based API programming guide 171 utilizes a mechanism referred to as Extensible Data Types (EDT), described in more detail in a subsequent flowchart. The use of EDT effectively embeds a mechanism in the API that allows additional functionality to be transparently added, the API is able to add new hardware services without the need to modify existing software. This mechanism must also provide this abstraction without significant performance overhead. By the use of pointer access to data types and inline functions, this effect is minimized. By abstracting the hardware from the software, the API allows the hardware and software development processes to be decoupled from one another. This significantly reduces development time, as each hardware upgrade or modification does not require changes to the software. Modes of configurations are specified in the API programmer's guide 171 for hardware kernel blocks. API programmer's guide 171 describes the allowed dataflow configurations (i.e. hierarchical interconnect configurations) of the machine. Appendix A provides an exemplary sequencing of the modem and codec functions described therein to realize a variety of transceiver signal paths by configuring the kernels and interconnect according to the types of operations and dataflow desired.

Through the use of extensible data types, a hardware configuration can be constructed to support various WCDMA standards. Furthermore, the types can be configured to support various performance requirements for the system as a whole, for a set of mobiles, or for a particular mobile. Hardware configurations are realized through an API that allows a programmer to manipulate the relationships between various extensible data types. The resources available in an extensible data type directly map to available hardware resources. A programmer using the API can configure the hardware resources from a conceptual viewpoint.

The programmer's model and API (or VMI) of FIG. 1D defines and provides a mechanism for a user to systematically and efficiently develop software that controls the function and operation of the configurable communication device, e.g., 100 of FIG. 1B. The API allows the programmer to manage the hardware resources without the need to write complex low-level hardware-target-dependent code. This provides many advantages including ease of adoption and integration of the configurable communication device. Subsequent flowcharts provide more detailed description of the process for developing the software to control the configurable communication device.

By providing a high level API, a user can design their software in a top-down fashion. This enables top-level system problems to be rapidly identified and corrected before the low-level code is written. Additionally, this approach saves a significant amount of development time as is removes the need to rework low-level software to match high level changes.

The programmers model and API of FIG. 1D also provides efficient use of hardware parallelism. Thus, the present invention provides a method and architecture that overcomes the challenging task of scheduling the many hardware resources in the complete system. This requires an efficient mechanism for communication between the hardware resources, both within a configurable processor, e.g., within configurable modem processor 102a of FIG. 1B, and between the configurable processors (e.g., between configurable modem processor 102a/codec processor 104 and the controlling processors, e.g., processor 112, BTS card controller 110a or 110b, and BTS cell controller 114 as shown in FIGS. 1B and 1C). The hardware utilization, scheduling, and maintenance are under the control of the API. By embedding these mechanisms in the API, a process can be designed in isolation, with the synchronization issues handled at only one level within the software hierarchy. This produces a system that is considerably quicker to build and more efficient in the use of hardware than one that uses many synchronization techniques within the design. RAVI: WRONG: Additional description on the process for providing C-based API programming guide 171 and API functions mapped to instruction set 172 is provided in co-pending patent application entitled "A METHOD FOR DESIGNING A CONFIGURATION FOR A CONFIGURABLE SPREAD SPECTRUM COMMUNICATION DEVICE," U.S. patent application Ser. No. 07/772,582, filed on Jan. 29, 2001, now U.S. Pat. No. 6,701,582. This related application is commonly assigned, and is hereby incorporated by reference.

The present embodiment of FIG. 1D can include additional features for individual versions of the software. Examples of this would be an input data formatter to deal with the incoming data format on a particular test rig, or the creation of a software version that performs function profiling or debugging on a particular section of the software, without having the attendant performance degradation on other blocks. Both of these alternatives are dealt with efficiently by the use of extensible data types, which allow a user to rapidly modify the functionality of the software by modifying the data types and recompiling.

Appendix B hereinafter provides several exemplary computer programs that can be implemented in functional block diagram 150 in order to provide an interface between a user and a configurable processor. In particular, Appendix B provides the specific application of a wireless base transceiver station for an exemplary CDMA spread spectrum application. However, the present invention is well suited to a wide range of spread spectrum communication applications. It is appreciated that one skilled in the art can interpret the computer language specific syntax provided in these examples.

Hardware Kernels

Referring now to FIG. 2A, a block diagram of a configurable modem processor 102a having multiple configurable hardware kernel planes used in an electronic spread spectrum communication device is shown, in accordance with one embodiment of the present invention. Codec processor 104 of FIG. 1B can have a configuration similar to that of FIG. 2A in one embodiment. FIG. 2A illustrates how the multiple hardware kernel planes interconnect and shows what device controls and coordinates them. Processor 102a can be configured to operate as a configurable modem processor 102a and 102b or as a configurable codec processor 104, as shown in FIGS. 1B and 1C, in the present embodiment.

In the present embodiment, two hardware kernel planes, e.g., plane [1] 201a and plane [i] and 201i, are coupled to an allocator 219 via a reconfiguration bus, e.g., 206a and 206i, respectively. Each hardware kernel plane is assigned to a given channel in a communication system in the present embodiment. In turn, allocator 219 is coupled to a general-purpose (GP) microprocessor or signal processor 112. To reduce overhead in terms of instruction fetch and global control, the architecture utilizes distributed control and configuration. The communication mechanism between each kernel is dataflow driven. Allocator 219 performs controller operations for each of the kernel planes 201*a* and 201*i*, such that they can operate independent of each other, e.g., in parallel.

To perform these functions, allocator 219 includes memory and state machine components. In one embodiment, allocator 219 is configurable such that it can manage the desired type of functions implemented in the hardware kernel planes 201*a* through 201*i*. For example, allocator 219 can be configured such that hardware kernel planes 201*a* through 201*i* perform modem functions, or alternatively codec functions. While the present embodiment shows only two hardware kernel planes 201*a* and 201*i*, the present invention is well suited to using any quantity of hardware kernel planes in processor 102*a*. Hardware kernel planes 201*a* and 201*i* include a configurable heterogeneous multi-processor architecture that will be described in more detail hereinafter. Data bus 122 provides data to and from configurable modem processor 102*a*, as does data line 130*a*, as shown in FIG. 1B.

Processor 112 performs higher-level management operations for the allocator. In this manner, multiple instances of processor 102*a* can be accommodated in a communication device, and can operate in varying degrees of parallel processing. In the present embodiment, processor 112 is a system processor of the parent communication device 100 FIG. 1B. However, configurable processor 102*a* can have a dedicated local microprocessor in lieu of system processor 112.

Referring now to FIG. 2B, a block diagram 200*b* of multiple possible architecture formats used in a hardware kernel portion of a spread spectrum communication device is shown, in accordance with one embodiment of the present invention. By using multiple levels of granularity in its components, the communication device possesses a wide breadth of efficient programmability. And efficient programmability translates into accommodating of multiple non-uniform specifications by a communication device. With each level of granularity having its own preferred target for a given application. A systematic and hierarchical method to exploit the flexibility of incorporating these different architectures into hardware is described in a subsequent flowchart figure.

FIG. 2B shows the four main levels of programmable or reconfigurable granularity used in a hardware kernel in the present embodiment. The difference in the various computational models shown in FIG. 2B lies in the granularity of the composing modules, the distribution of the program storage, and the interconnect structure. In one embodiment, the computing elements in a hardware kernel can exploit any combination of the four types of reconfigurability, in an architecture referred to as Dynamically Reconfigurable Logic (DRL), described in more detail hereinafter. However, the present invention is well suited to incorporating other types of computational models that have different levels of granularity or different applications of granularity.

A first architecture format is referred to as reconfigurable logic 211. Reconfigurable logic 211 uses multiple processing islands, also referred to as a configurable logic block (CLB), e.g., 210*a* coupled by an interconnect 214 with reconfigurability, via bus lines, e.g., 212*a*, 212*b*, 213*a*, and 213*b*. The reconfigurable logic type of engine relies almost exclusively on bit-level mesh networks in the present embodiment. In the present embodiment, interconnect 214 provides all possible coupling arrangements between the bus of data liens 212*a* and 212*b*. In this manner, independent blocks 210*a*-210*d* can communicate with one another in any desired manner. That is, they are not restricted to communicating with less than all existing kernels due to limited hardware wiring. In another embodiment, interconnect 214 can provide only a limited amount of interconnectabiltiy, based upon perceived needs and capabilities of each kernel for a given application. Reconfigurable logic 211 uses bit-level operations such as encoding. By itself, reconfigurable logic provides significant benefits of flexibility. However, the flexibility comes at a trade-off of inefficiency in chip area and in power consumption. In one embodiment processing islands have unrestricted reconfigurability of its component logic devices.

A second architecture format is referred to as reconfigurable datapath 221. The interconnect network of the reconfigurable datapath exploits the bit-sliced structure and predominantly one-dimensional flow of data by using an asymmetric network-reconfigurable buses in one direction and bit-level mesh in the other direction. That is, reconfigurable datapath 221 uses dedicated datapaths to transmit data between electronic components, such as mux 220 and adder 226. For example, multiplex (Mux) block 220 can multiplex data from multiple data lines onto a single data line, thus changing the data path. Additionally, data may be directed along one of multiple paths to an appropriate storage register, e.g., register 0 (Reg0) or register 1 (Reg1). From an appropriate storage register, data may be directed along a path to a given function block, e.g., adder 226 or buffer 228. Reconfigurable datapath 221 can efficiently move data, but it lacks flexibility that is not built into the original architecture. Thus, for example, the data path is limited to the data lines built between components, e.g., 220 through 228.

A third architecture format is referred to as reconfigurable dataflow 231. With reconfigurable dataflow, control exists over the type of arithmetic used in a processing unit (i.e. dataflow process). The reconfigurable dataflow architecture uses a program and data bus that feeds data and control instructions to a computation unit. In particular, block 232*a* and 232*b* generate addresses to get data from memory, e.g. 234*a* and 234*b*, to be sent to a multiply—accumulate (MAC) block 236 for processing.

A fourth architecture format is referred to as reconfigurable logic 241. Reconfigurable logic 241 refers to a real-time operating system (RTOS) where the outside source controls the type of state machines that control the dataflow process (i.e. controlflow process). With reconfigurable logic 241, the stored-instruction engines rely on shared buses for the transfer of data and instructions. Block 240 is the data memory storage of data to be processed, while block 242 is the program memory for storing program instructions used to run on instruction decoder and controller 246. Block 394 is the datapath block, which contains the arithmetic operations for processing the data. Memory block 390*b* is a second bank of data memory for interfacing data with data path block 394.

By combining these four types of architecture, as described hereinafter, in a manner that matches the programming, function, or temporal granularity needed for a given algorithm, function, application, and/or classes thereof, the present invention provides a hybrid architecture and system. This hybrid architecture and system provides substantial improvements in performance over previously irreconcilable tradeoffs of speed, flexibility, and efficiency.

Referring now to FIG. 2C, a block diagram of a hardware kernel plane used in the electronic spread spectrum communication device is shown, in accordance with one embodiment of the present invention. Hardware kernel plane 201a provides the capability of reconfigurability for a range of protocols in an application, or within a range of applications, with an efficiency that challenges conventional circuits. Additionally, hardware kernel plane 201a is modular, and thus may be designed to operate in groups.

Kernel plane 201a includes multiple hardware kernels K1 261a through K6 266a that are coupled to a reconfigurable interconnect 204a. Data is passed between kernels K1 261a through K6 266a via reconfigurable interconnect 204a. Control information, such as handshake protocol signals, can also be routed through reconfigurable interconnect 204a. Hardware kernel, e.g., K1 261a, is described in detail in a following figure. Interconnect architecture supports sufficient concurrency within each of the hardware kernels K1 261a through K6 266a. In the present embodiment, reconfigurable interconnect 204a utilizes a hierarchical structure that can support the required interconnect patterns (as described by the dataflow in following flowchart figures), as well as provide good performance and energy efficiency for every configuration. While the present embodiment uses six hardware kernels, the present invention is well suited to using any quantity of kernels in kernel plane 201a.

In the present embodiment, hardware kernels K1 261a through K6 266a kernels are specific to the types of data processing found in wireless communication applications, such as CDMA. However, at the same time, hardware kernels K1 261a through K6 266a are heterogeneous with respect to one or more of each other, in terms of programmability, algorithmic-capability, performance-level, and/or math-logic. However, two or more kernels within kernel plane 201a can be homogeneous with respect to each in another embodiment. The specific composition and relationship between hardware kernels depends upon the specific application. Examples of these levels of programmability are provided in a subsequent figure. One or more of hardware kernels K1 261a through K6 266a are also autonomous with respect to each other, thus allowing parallel processing of data, on a kernel-by-kernel basis, or on a kernel-group by kernel-group basis. Because of this autonomy, and local control, the individual hardware kernels as well as the hardware kernel plane is data-rate scalable to a range of system clock rates.

Kernels K1 261a, K4 264a, and K5 265a are grouped together in hardware kernel group A 268a. Similarly, hardware kernel K3 263a is identified as a sole kernel within hardware kernel group B 268b. These two exemplary kernel groupings provide a class of functions for the present host communication device which applies them to a wireless communication protocol application, as will be described in a subsequent flowchart figure.

Hardware kernels, e.g., kernel K1 261a are coupled to a configuration (or reconfiguration) bus 206a, e.g., via line 274. Configuration, status, and control information are passed to kernels K1 261a through K6 266a via reconfiguration bus 206a, in the present embodiment. However, the present invention is well suited to passing different types of data and information using a wide variety of data lines and data bus configurations.

Reconfigurable interconnect 204a has an architecture that is primarily a reconfigurable logic 211, as described in FIG. 2B. In this embodiment, reconfigurable interconnect 204a provides connectivity between input/output lines of multiple kernels, or between input/output lines of a kernel with components outside of kernel plane, e.g., allocator 219, processor 112 shown in FIG. 2A, or other data buses (not shown). Data is passed between kernel plane 201a and the host communication device via an input/output line, e.g., line 122, that is coupled to reconfigurable interconnect 204a.

In one embodiment, reconfigurable interconnect 204a has only a limited amount of reconfigurability based upon the specific needs identified for a class of protocols in a given application, or for a class of applications. That is, based on an application, algorithm, function, operation, or class thereof, not all kernels will be required to have full interconnectabiltiy with all other kernels. Consequently, the present embodiment provides limited reconfigurability of interconnect 204a between kernels depending upon the needs of the application, function, algorithm, etc. for which a kernel is designed. The limitation on interconnectabiltiy provides the benefit of reconfigurability where it is needed, and restricts interconnectabiltiy where it is not needed. Thus, the inefficiently of a totally reconfigurable interconnect is tempered by identifying strategic scenarios where reconfigurability is appropriate. The strategic scenarios involve the class of functions to be performed, the design of individual kernels K1 261a through K6 266a to accommodate the class of functions, and the level of programmability provided for outside control. The common ground between the class of functions, operations, or algorithms is a case-by-case basis requiring analysis of variables such as mathematical basis, signal processing operations, algorithmic patterns, and silicon implementation.

Data is provided and received from kernel plane via data bus 122 or data line 130a. In the present embodiment, an input data line portion of data bus 122 is coupled to one side of reconfigurable interconnect 204a to provide data input to kernel plane 201a. Similarly, an output data line portion of data bus 122 is coupled to the other side of reconfigurable interconnect 204a to receive data from kernel plane 201a. Data that is provided to reconfigurable interconnect 204a is then routed to appropriate kernels K1 261a through K6 266a per configuration information provided to communication device. Alternatively, an input line portion of data bus 122 can be directly coupled to one or more of kernels K1 261a through K6 266a, e.g., if this functionality of a particular kernel is consistent across a range of spread spectrum applications. For example, if a kernel plane for a modem operation always initially performs an interpolation filter operation on input data regardless of the applications within a class of spread spectrum communications, then input data line may be routed directly to the kernel responsible for this function. The same coupling arrangement can be provided for data line 130a with respect to reconfigurable interconnect 204a and kernels K1 261a through K6 266a. While the present embodiment provides for less than full interconnectabiltiy, the present invention is well suited to providing the full interconnectabiltiy between all kernels.

The modem signal processor is one instance of the heterogeneous reconfigurable architecture, which can be configured to provide a complete signal path for multichannel operation of a CDMA base-station. The hardware kernel processors were designed with a strong focus on applying the flexibility vs. computational efficiency trade-off to the specific needs of an application. As such, a rank ordering of the dominant computation-intensive kernels found in the algorithms is identified. For example, in a typical WCDMA application, the dominant computations are centered around five major signal processing functions: chip matched filtering, code-epoch search, chip demodulation/despreading, channel decoding, and inter-path (IPI) equalization (optional). While the present invention provides an enumerated list of computational categories for a hardware kernel, the present invention is well suited to using specific quantities and types of categories as is appropriate for a given application.

Bus 206a of FIG. 2C is selectively reconfigurable to provide only the needed amount of interconnectivity to a kernel based upon the application, function, and/or algorithm, for which a kernel is designed. For example, in one embodiment, kernel K3 263a does not require a status flag because the operation it performs requires no feedback and is run to completion. Thus, reconfiguration bus 206a provides no bus capability to kernel K3. In another embodiment, however, interconnectivity to provide communication of status information between a hardware kernel with another hardware kernel or allocator can be provided.

Referring now to FIG. 2D, a block diagram of a kernel portion of a hardware kernel plane is shown, in accordance with one embodiment of the present invention. Kernel K1 261a provides one embodiment of many possible embodiments, which any of multiple hardware kernels in a kernel plane may use.

Kernel K1 261a includes a configuration information block 272 and a satellite kernel block 270, coupled to each other by interconnect 276. Satellite kernel 270 has an input/output data line 278, which is a bus in the present embodiment, that provides communication with reconfigurable interconnect 204a of FIG. 2C. Similarly, configuration information block 272 is coupled with reconfiguration bus 206a of FIG. 2C, via configuration line 274. In one embodiment, configuration line 274 is a bus into configuration information block 272, or can be a single line with multiplexed data. The amount of data the bus or single line can handle can vary widely, depending upon the needs of an existing or projected application. Satellite kernel 270 is an electronic device, which is algorithmic specific in the present embodiment.

Configuration information block 272 is random access memory (RAM) in the present embodiment. However, the present invention is well suited to using any medium for configuration information block 272 that can preserve and communicate a state condition for electronic devices. For example, configuration information block 272 can be registers, flash memory, or a state machine, e.g., using reconfigurable logic, that provides bit stream of states to satellite kernel block 270. By having configuration information block 272 as a local dedicated source, that can also be controlled local to satellite kernel 270. This arrangement provides a very quick and efficient changing of configuration data for algorithmic satellite kernel 270. Consequently, time-sharing of a hardware kernel is feasible and practical in the present embodiment.

In the present embodiment, hardware kernels e.g., K1 261a through K6 266a of FIG. 2C, have been designed to fit into one of multiple categories of data processing applicable to wireless communication. The category of data processing refers to the operational speed of the hardware kernel, which includes an energy-flexibility tradeoff. The specific category for which a hardware kernel is designed is determined from the number and type of operations per sample of data processed in the hardware kernels. The present embodiment utilizes five domains of signal processing categories for a wireless communication system. They include: 1) Sub-chip-rate (M times chip-rate=Mfc); 2) Chip-rate (chip-rate=fc); 3) Sub-symbol rate (fc/L, with multiple chips per processing period, which is less than one symbol interval); 4) Symbol-rate (fc/N=fs=symbol rate); and 5) Multi-symbol rate (fs*K, with multiple symbols per processing period, which spans more than one symbol).

The kernel processors cover the multi-standard CDMA signal processing requirements, and can be categorized corresponding to classes of MOPS. In the present embodiment, signal processing for a wireless communication application includes the following classes of MOPS: 1) Code Demodulation/Dechannelization; 2) Code Generation; 3) Parameter Estimation; 4) Sequence Alignment and Combining; 5) Equalization (optional); and 6) Front-end Processing.

Satellite kernel 270 includes a controller 271 and a configurable computation kernel (or algorithmic-specific computing element) 273a, coupled to each other via a clock line 279 and a control line 284. Configurable computation kernel 273a is also referred to as a computing element or a processing engine.

Controller 271 includes a state machine with memory, in the present embodiment, that is capable of controlling configurable computing element 273a. In another embodiment, controller 271 includes only memory that is capable of preserving state conditions of at least one configuration of configurable computing kernel 273a. To achieve distributed control, kernel K1 261a is equipped with an interface that enables it to exchange data streams with other kernels efficiently, without the help of a global controller. Hardware kernel K1 261a uses a distributed control and configuration via local controller 271, which effectively reduces overhead in terms of instruction fetch and global control. Kernel K1 261a also includes an interface, e.g., in configurable computation kernel 273a, that enables it to exchange data streams, e.g., data line 278, with other kernels efficiently, without the help of a global controller. The communication mechanism between each kernel is dataflow driven in the present embodiment. Local controller 271 can provide local control signals for initiation, reset, and interrupt for configurable computation kernel 273a, as well as scaled clock rates.

In the present embodiment, configurable computation kernel 273a is designed specifically to perform a given algorithm, function, operation, or class thereof. Therefore, satellite kernel 270 has flexibility, e.g., reconfigurability, within the class of functions, operations, or algorithms to which it has been designed. By virtue of the fact that configurable computation kernel 273a is designed for a relatively narrow application in the present embodiment, it is consequently very energy efficient. Thus, it meets the needs of a wide range of communication protocols within a spread spectrum category, while being very efficient. Additionally, because satellite kernel 270 has its own local controller 271, it operates autonomously with respect to the balance of the kernels in a hardware kernel plane, and to the balance of the communication device. Thus, satellite kernel 270 can be activated or bypassed for a given function of an application, depending on the needs and protocol chosen for the application. A description of the configuration and operation of a satellite kernel 270 is presented in a subsequent flowchart. The present architecture is well suited to a wide range of data processing functions, operations, and applications besides spread spectrum communication applications.

In the present embodiment, computing element 273a includes an architecture of electronic devices with coupling arrangements, from one or more of the possible techniques described in FIG. 2B. That is, depending upon the function, algorithm, operation, or class thereof, being implemented by the hardware kernel, computing element 270 can include any combination of the techniques for device choice and configuration, including reconfigurable logic 211, reconfigurable datapath 221, reconfigurable dataflow 231, or reconfigurable logic 241. In the present embodiment, the computing element in a hardware kernel, e.g., computing element 273a of K1 261a, can exploit any combination of the four types of reconfigurability, in an architecture referred to as Dynamically Reconfigurable Logic (DRL). However, the present invention is well suited to incorporating other types of computational models that have different levels of granularity or different applications of granularity. Additionally, the techniques of FIG. 2B used in configurable hardware kernel can be chosen depending upon the uncertainty of a design or function within the communication device. Thus, by providing a very flexible architecture to an autonomously controlled configurable hardware kernel for the narrow scope of an uncertain function or algorithmic technique, the present invention frugally allocates the most flexible reconfiguration resources. However, the present invention is well suited to complementing these enumerated techniques with other configuration and architecture techniques.

Because the computing element 273a is function (or algorithmic) specific each of the techniques used is subsequently function specific. Thus, the electronic devices and their interconnections can utilize function-specific reconfigurable logic 211, function specific reconfigurable datapath 221, function-specific reconfigurable dataflow 231 and/or function specific reconfigurable logic 241 techniques as shown in FIG. 2B in one embodiment. The function-specific aspect of the devices and their interconnects means that the device is only effective and useful for the intended function, sub function, or classes thereof, in this embodiment. By doing so, this architecture efficiently delivers a class of MOPS with flexibility in the configuration of these MOPS and scalability across data rates and channel densities.

Electronic devices refer to the basic building blocks of electronic circuits such as transistors, diodes, resistors, conductors, and other elements that are well known in the art. The collection of electronic devices and interconnects can be figuratively divided into a fixed grouping 275a and a flexible grouping 275b, intercoupled to each other on a device level, as required by the function implemented therein. For example, in one embodiment, flexible architecture can be used to selectively group and couple registers to implement a class of functions whose math operations vary by their bit length, depending on the protocol used.

Thus, each of the multiple hardware kernels described in FIG. 2C have an architecture that is tuned to its intended function. In the present embodiment, the combination of architecture in a computing element is dependant upon the functions, or class of functions, to be performed by the hardware kernel. Other variables, such as performance requirements, user preferences, future expandability into undefined protocols are also included as inputs in the choice of architectures. Because the hardware kernels each have a discrete function, operation, or class thereof, they can be evaluated as true object-oriented hardware.

Thus, a channel element can be built-up from the set of configurable hardware kernels to realize a reconfigurable multi-channel digital base band modem signal path that performs all the digital modulation-demodulation as well as channel encoding-decoding required per logical channel for all narrowband and Wideband telecommunication standards. In the present embodiment, kernel plane can form a modem card in a systematic and modular fashion in modules of multiple channels per card, depending on their radio (cell-site) system planning. The present invention can be adapted to accommodate a wide range of channels.

In the present embodiment, two or more types of configurable architecture techniques are used in a given hardware kernel. However, the present invention is well suited to using a single type of configurable architecture is used in a given hardware kernel. Additionally, the kernel compositions can vary within a hardware kernel plane, and between hardware kernel planes. Multiple types of architecture can be strategically located and coupled within a hardware kernel to accommodate the particular variation in the function/sub function desired. For example, if the variation for sample select sub function over IS2000, and 3GPP, 3GPP-FDD, 3GPP-TDD, and 1Xtreme protocols includes the number of bits selected, then the hardware kernel includes a reconfigurable logic for the interconnect bus and the storage location associated with the range of bits and a reconfigurable datapath for the balance of the circuit.

The present invention is well suited to using a wide range of architectural techniques shown in FIG. 2B, and combinations thereof, from which individual hardware kernels are designed, constructed, and operated. These hardware kernels are capable of performing a wide range of functions within a class that spans a wide range of spread spectrum applications. Exemplary functions, for which kernels can be configured, are shown in FIGS. 2B, 2C, and 5, and are described hereinafter in Appendix A, entitled "Data Kernel Specification List."

Several exemplary hardware kernels have been defined in related co-pending patent applications and are applicable in the present communication device, e.g., 100 of FIG. 1b. While these related patent applications provide a specific function for hardware kernels, the present invention is well suited to a wide range of data processing functions for electronic devices, such as a spread spectrum communication device. These commonly assigned and related applications, which are incorporated herein by reference, include:

1) "A CONFIGURABLE CODE GENERATOR SYSTEM FOR SPREAD SPECTRUM APPLICATIONS," U.S. patent application Ser. No. 07/751,782, filed on Dec. 29, 2000, now U.S. Pat. No. 6,567,017;

2) "A CONFIGURABLE MULTIMODE DESPREADER FOR SPREAD SPECTRUM APPLICATIONS," U.S. patent application Ser. No. 09/751,785, filed on Dec. 29, 2000;

3) "A CONFIGURABLE ALL-DIGITAL COHERENT DEMODULATOR SYSTEM FOR SPREAD SPECTRUM APPLICATIONS," U.S. patent application Ser. No. 09/751,783, filed on Dec. 29, 2000; and 4) "METHOD AND APPARATUS FOR PROCESSING A SECONDARY SYNCHRONIZATION CHANNEL IN A SPREAD SPECTRUM SYSTEM," U.S. patent application Ser. No. 09/772,583, filed on Jan. 29, 2001, filed herewith.

The term architecture describes the electronic devices and coupling arrangements used in configurable hardware kernel plane 201a of FIG. 2C, Kernel K1 261a and configurable computation kernel 273a of FIG. 2D, reconfigurable interconnect 204a of FIG. 2C, and the specific exemplary hardware kernels provided in the aforementioned applications. The coupling arrangements include interconnect routing, grouping, and hierarchy. The various combinations of reconfiguration techniques 211, 221, 231 and 241 of FIG. 2B also describe the architecture of the configurable computation kernel 273a, the reconfigurable interconnect 204a, and the specific exemplary hardware kernels. Devices can include components such as gates, selective interconnects, memory, lines, buses, and a wide range of conventional devices that are chosen and coupled in order to satisfy the functional requirements of a given application. More information on architecture of configurable devices can be found in the text "Software Radio Architecture," by Joseph Mitola III, which is hereby incorporated by reference.

Referring now to FIG. 2E, a block diagram of a hardware kernel containing a subcomponent hardware kernel is shown, accordance with one embodiment of the present invention. Hierarchical block diagram 120b has many components and coupling arrangements that are similar to those presented in FIG. 2D. For purposes of clarity, only a description of components, coupling arrangements, and alternative embodiments for FIG. 2E that are different from FIG. 2D will be provided herein; otherwise, the description of components, coupling arrangements and alternatives provided in FIG. 2D will apply similarly to the present figure.

Satellite kernel 270a includes a hierarchy of hardware kernels, wherein another hardware kernel K7 317a is included therein. Kernel K7 317a, having an exemplary configuration as K1 261a of FIG. 2D, provides a dedicated support kernel function to its parent kernel K1 311a. An additional control line 284a and clock line 279a is provided to dedicated hardware kernel K7 317a. Due to the hierarchy, dedicated hardware kernel K7 317a can step up a clock rate another level for its own functions if needed for a given application.

Different configurations of a hardware kernel within a hardware kernel can exist depending on the needs for a given function in a given application. For example, in a spread spectrum application, an exemplary cellular telephony function can tailor parent kernel K1 311a for performing a demodulation operation or a matched filter operation. Either of these functions can benefit from a dedicated hardware kernel, e.g. K7 317a, providing dedicated code generator functions. In this manner, hardware kernel K7 317a can run autonomously under the control of its parent kernel K1 311a. This configuration and architecture provides local control and operation, which consequently reduces traffic on a system processor or controller. The present invention is well suited to a variety of hierarchical levels or parent hardware kernels having different quantities of dedicated kernels therein.

Figure 2F:
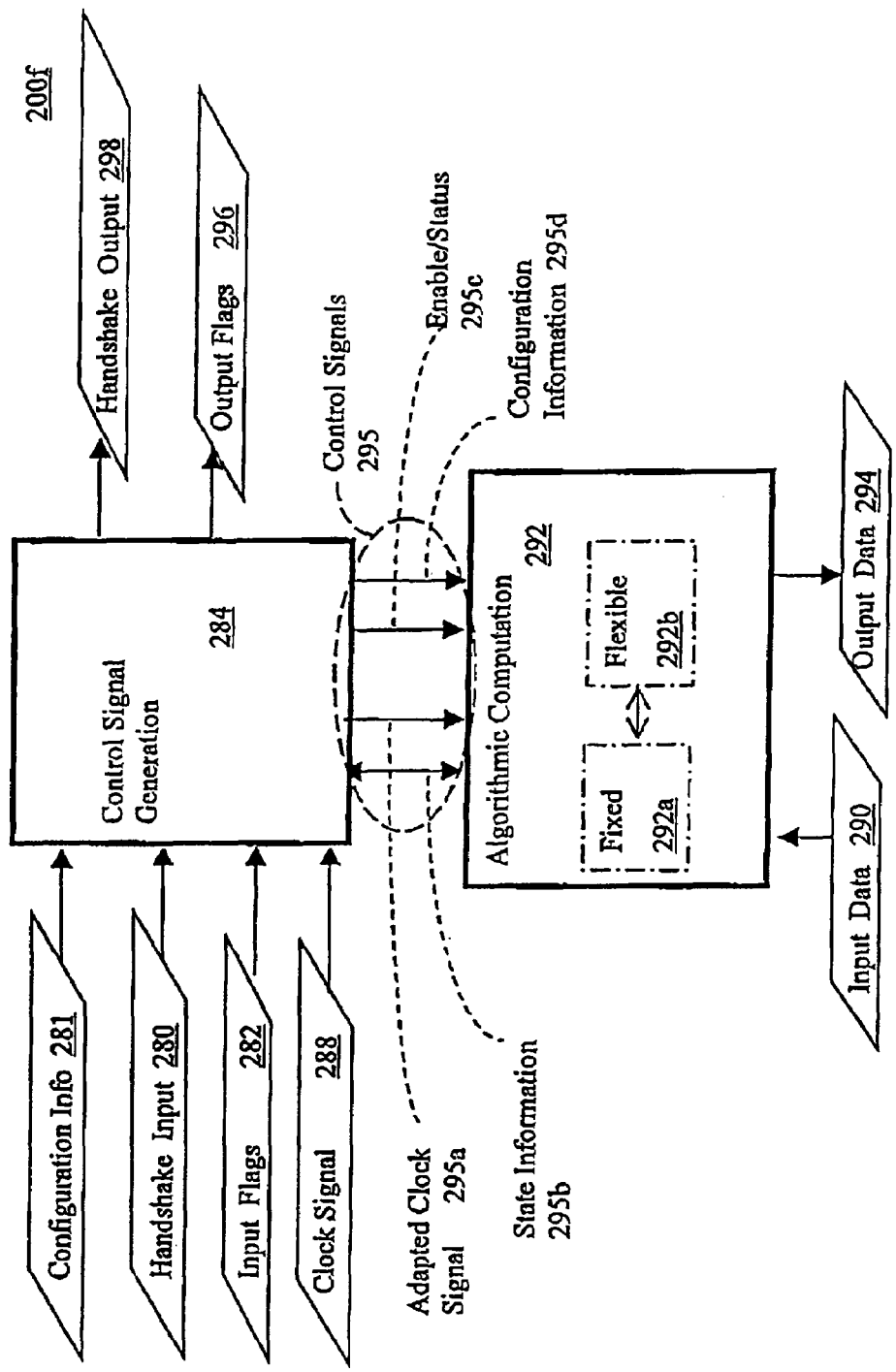
FIG. 2F is a block diagram of the inputs, outputs, and functions accommodated by the algorithmic satellite kernel in the electronic spread spectrum communication device, in accordance with one embodiment of the present invention.

Referring now to FIG. 2F, a block diagram 200f of the inputs, outputs, and functions accommodated by a hardware kernel in an electronic spread spectrum communication device is shown, in accordance with one embodiment of the present invention. Functions described in block diagram 200f represent operation of exemplary hardware kernel(s) of FIGS. 2C through 2F.

Handshake input 280, input flags 282, and configuration information 281 is received at control signal generation block 284. Handshake input 280 is a signal from a source outside of a hardware kernel that initiates the operation of the hardware kernel, via a control signal generation block 284. Input flags 282 alter the data, states, or functions of a hardware kernel. For example, a handshake input 280 can enable the hardware kernel functions (or algorithmic computations) 292 to proceed, while an input flag 282 will enable an appropriate communication of a previous state condition for hardware kernel functions 292. Note that the specific conditions, uses, and quantity of input flags can vary widely according to the needs of a particular function in a particular application, and the capacity of the hardware kernel functions. Configuration input 281 provides information on how to configure hardware in a hardware kernel so as to perform the desired algorithm computation function. Configuration input 281 includes information specifying: 1) type of operations to be performed; 2) inputs; 3) outputs; and 4) parameters of the configurable hardware kernel. Configuration input 281 can also include information regarding the interconnect configuration used to build a cluster, or group, of kernels for implementing a function or sub function.

Control signal generation block 284 includes sub functions of preserving e.g., recording, and transmitting a state or a configuration of a hardware kernel as directed by handshake input 280 and configuration input 281. Control signal generation block 284 also includes a sub function of clock scaling. Lastly, control signal generation block 284 generates output flags 296 and a handshake output 298 to components outside of the hardware kernel. Thus, in the present embodiment, control signal generation block 284 provides a control signal, via a bus or a multiplexed line, to algorithm computation function block 292 that includes an enabling/status signal 295c, a state condition signal 295b, and configuration information signal 295d. Control signal generation block 284 also provides an adapted clock signal 295a to algorithm computation block 292.

Clock scaling sub function can speed up, slow down, or preserve the rate of the system clock signal 288 received at control signal generation block 284. The specific rate of the adapted clock signal 295a depends upon the rate of data processing for which algorithm computation block 292 is designed. Clock signal input 288 is a system clock of the communication device in the present embodiment.

In one embodiment, handshake output 298 and output flags 296 indicate the status of a hardware kernel or of data processed by algorithmic computation block 292. For example handshake output 298 or output flags 296 include information such as successful execution, error rate, state condition, etc.

Algorithmic computation block 292 performs a desired algorithm for a set of data, received as input data 290. Inputs 295b, 295c, and 295d from control signal generation block 284 allows algorithmic computation block 292 to essentially perform its algorithmic-specific function autonomously from the balance of the communication device. During or after the completion of its function, algorithmic computation block 292 provides output data 294 to sources outside of hardware block, and provides status information 295 to control signal generation block 284 for subsequent handshake or flag setting.

Algorithmic computation block can be figuratively divided in to a fixed portion of the algorithm 292a and a flexible portion of the algorithm 292b, communicating information to each other. The fixed portion block 292a of the algorithm computation is the portion whose algorithmic functions essentially do not change for different communication protocols, e.g., the core functions or the common math that can be extracted from the different algorithms required for each protocol. In contrast, the flexible portion 292b of the algorithm computation is the portion that does change for different communication protocols. In one embodiment, the fixed portion 292a and flexible portion 292b of the algorithmic computation corresponds to the fixed portion 275a and flexible portion 275b of configurable computation kernel 273a shown in FIG. 2D.

In the present embodiment, function blocks in block diagram 200f are implemented by hardware components described in FIGS. 2A through 2F. For example, one embodiment implements algorithmic computation function 292 of FIG. 2F via computing element 273a of FIG. 2D, and implements control signal generation block 284 in controller 271 and configuration information block 272. Clock signal input 288, handshake input 280, and input flags 282 are provided to control signal generation block 284 via configuration line 274, and are communicated between components in hardware kernel 261a via an interconnect line 276, clock line 279, and control line 284. Handshake output 298 and output flags 296 are transmitted on configuration line 274.

Input and output flags, and handshake input and output, can be provided to/from another hardware kernel in the hardware kernel plane or to/from components outside of hardware plane 201a, via reconfiguration bus 206a. While the present embodiment provides specific hardware components and configurations for implementing hardware kernel functions 200f, the present invention is well suited to using a wide variety of hardware components and configurations for accommodating locally controlled algorithmic specific function blocks.

The present embodiment of components, configuration and functionality of hardware kernels shown in FIGS. 2B through 2G are capable of providing an operating efficiency from greater than 10 to several hundred (100) MOPS/mW in the present embodiment. This rate is well ahead of what is achievable from a programmable digital signal processor. Yet the present embodiment also provides a level of flexibility over a wide range of functions and a level of user control that is well beyond that of a traditional ASIC. The present invention is well suited to deliver a wide range of computation power and computational efficiency, depending upon the semiconductor process technology, VLSI integration/physical design method.

Function Planes

Figure 3A:
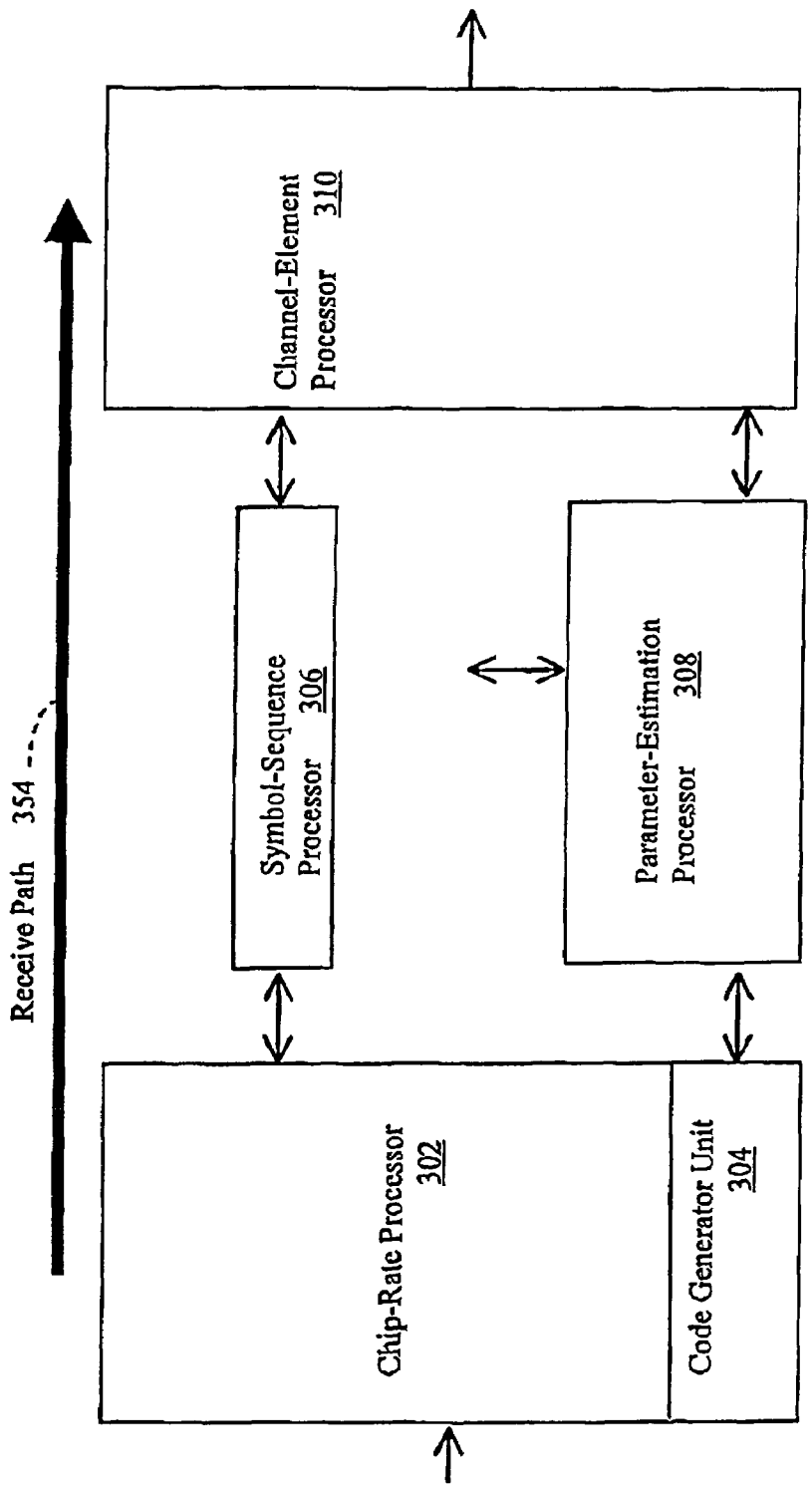
FIG. 3A is a functional data flow diagram for configurable multiprocessors in a modem application, in accordance with one embodiment of the present invention.

Referring now to FIG. 3A, a functional data flow diagram 300a for configurable multiprocessors in a modem application is shown, in accordance with one embodiment of the present invention. The connections between the blocks indicate the spatial connectivity between the groups, while the general layout from left to right is indicative of the hierarchy of operation sequence.

Block diagram 300a includes a chip-rate processor block 302 coupled to a symbol-sequence processor block 306 and parameter-estimation processor block 308. Both symbol-sequence processor block 306 and a parameter-estimation processor block 308 are coupled to each other and to a channel-element processor block 310. Data input is first received in chip-rate processor block 302 and is output from channel element processor block 310. Specific configurations of hardware kernels that can be categorized within each of the processor groups of FIG. 3A, according to their processing rate are described hereinafter.

Chip-rate processor block 302 performs operations at a chip-rate, e.g., at 1.2288 Mega chips per second (Mcps) as required for an exemplary communication protocol. The chip rate implicitly refers to the bit-rate at which data is received at a communication device, e.g., via an analog to digital (A-D) converter. Chip rate processor block 302 includes a segregated component of a code generator unit (CGU) block 304. CGU block 304 is explicitly delineated from the chip-rate processor block 302 because it can be spatially and temporally shared among multiple chip-rate processing realizations. That is, CGU block 304 can be shared among multiple instances of configurable modem processor 102a of FIG. 1B. While the present embodiment refers to a specific numeric rate, the present invention is well suited to using any number rate, assuming a relative relationship between the blocks as indicated in FIG. 3A.

Symbol-sequence processor block 306 communicates information between chip-rate processor block 302, parameter estimation processor block 308, and channel-element processor block 310. Similarly, parameter-estimation processor communicates information from chip-rate processor block 302 and channel-element processor block 310.

Hardware kernels can be organized into five classes of signal processing units, as described in the list below. For example, sample-epoch refers to a kernel capable of performing sample-epoch calculations, and because the specification requires this operation be performed at a chip-rate, it is categorized in the chip-rate processor group. The first group is a chip-rate processor group, which includes the following functions: Sample-epoch Selector; Multi-standard Despreader; Multi-standard Dechannelizer; Code Generation Unit; Integrate and Dump Unit; and Multi-standard Searcher Control. The second group is a Symbol-Sequence Processor Group, which includes the following functions: Transport Format Decoder; Dynamic Spreading Factor Computer; Fast Hadamard Transform; and Rotator/Squarer. The third group is a Parameter-Estimation Processor Group, which includes the following functions: Energy Estimator; Timing Parameter Estimator; and Channel Estimator. The fourth group is a Channel-Element (multi-finger) Processor Group which includes the following functions: Alignment/Deskewer; Combiner; Soft-decision Computer; Interpath Interference Equalizer; and Receive Antenna Diversity Combiner. The fifth and final group is a Front-End Group, which includes the following functions: Data Switch Selector; and Sample Interpolator.

The specifications for each of the hardware kernel capabilities are provided in Appendix A, hereinafter. It is appreciated that one skilled in the art understands the references to CDMA and communication signal variables and protocols described in Appendix A. Additionally, Appendix A also provides an exemplary sequencing of the modem and codec functions described therein to realize a variety of transceiver signal paths by configuring the kernels and interconnect according to the types of operations and dataflow desired.

While the present embodiment provides for the aforementioned specific kernel designations, functions, input, outputs, and parameters, the present invention is well suited to including alternative or additional kernel designations, functions, inputs, outputs, and parameters. For example, the present invention is well suited to different communication protocols such as time division multiple access (TDMA), or to future CDMA communication protocols, that are as yet, unspecified. Furthermore, while the present embodiment provides for specific levels of processor rates, the present invention is well suited to using different processor rates, or different relative levels of processor rates.

Figure 3B:
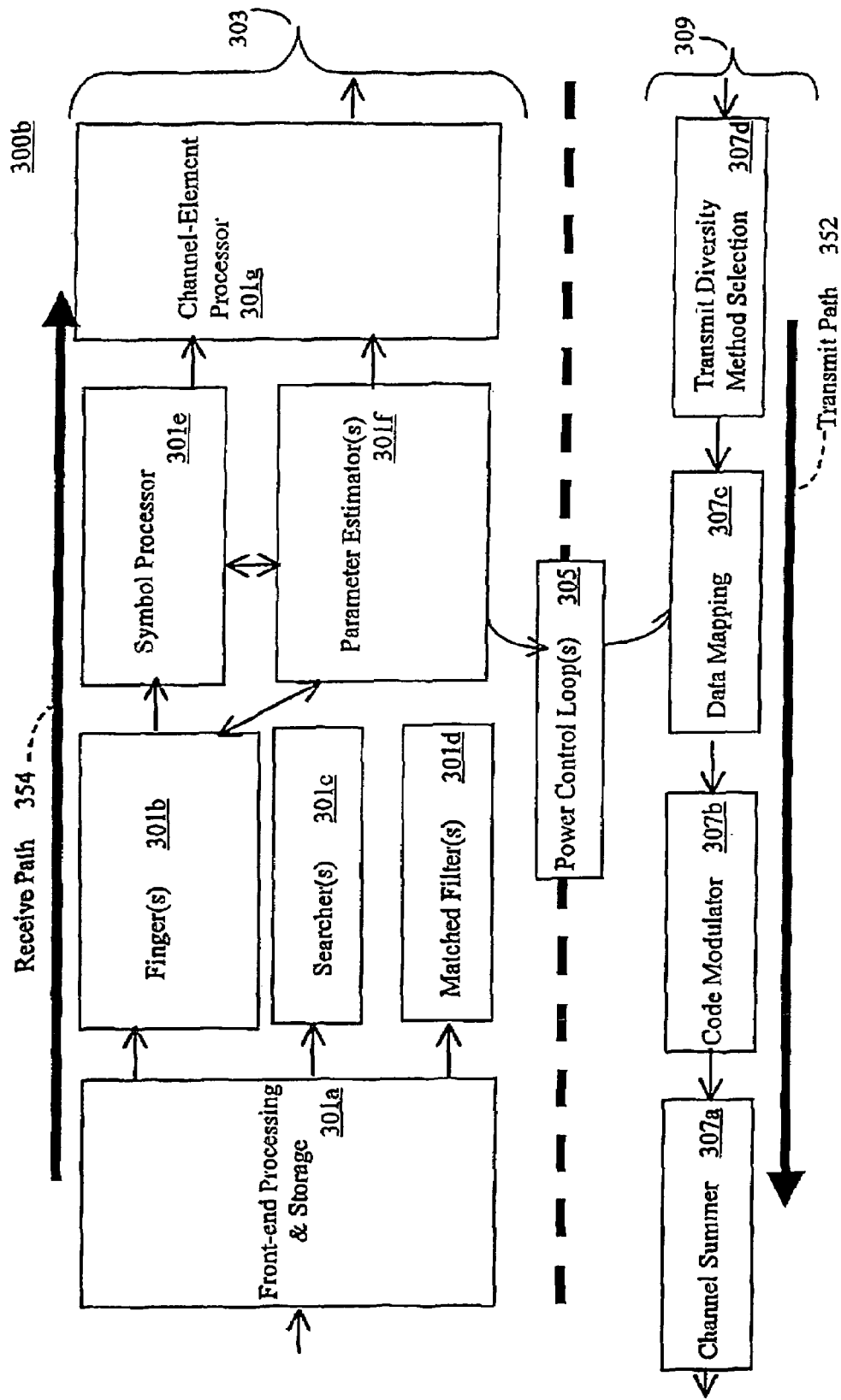
FIG. 3B is an alternative functional data flow diagram for configurable multiprocessors in a modem application, in accordance with one embodiment of the present invention.

Referring now to FIG. 3B, an alterative functional data flow diagram 300b for configurable multiprocessors in a modem application is shown, in accordance with one embodiment of the present invention. The blocks and their coupling represent an alternative embodiment to those: presented in FIG. 3A in which a communication device, e.g., device 100 of FIG. 2, operates.

FIG. 3B provide function blocks (or groups) for both a receive path 354 as well as a transmit path 352. The general layout from left to right is indicative of the hierarchy of operation sequence and flow of data for the Receive path 354 direction. In particular, Receive path 354 includes a front-end processing and storage group 301 coupled to provide data to finger(s) function block 301b, to searcher(s) function block 301c, and to matched filter(s) function block 301d. In turn, Finger(s) block 301b is coupled to provide data to symbol processor block 301e and to parameter estimator(s) block 301f. Symbol Processor block 301e is coupled to provide data to channel-element processor block 301g. Searcher block 301c and matched filter block 301d provide feedback to finger(s) block 301b via internal software control of communication device 100 of FIG. 1B. Parameter estimator(s) block 301f provides control information to power control lop block 305 which then is coupled to forward processed control information to data mapping block 307c for regulating data on the transmit path 352.

In contrast, transmit path 352 provides a more linear data flow starting with a transmit diversity method selection block 307d coupled to provide data to data mapping block 307c. In turn, data mapping block processes data with the input from the power control loop(s) block 305 and forwards it to code modulator block 307b. Lastly, code modulator block 307b is coupled to communicate modulated data to channel summer 307a.

Functional kernels, such as those shown in the subsequent figure, are used to enable each of the functional groups in FIG. 3B. In turn, hardware kernels similar to those in FIGS. 2C and 2D are used to implement the functional kernels. An example of functional kernel operation is provided in Appendix A, included herein. This group of hardware groups allows flexibility in the architecture of the interface to the antenna bus, e.g., bus 129 of FIG. 1B. The interface is designed to support both new and legacy equipment via multirate filtering supporting operation over multiple chip rate inputs Referring now to FIG. 3C, a block diagram 300c of several user-defined modes of operations performed for modem signal processing functions in the electronic spread spectrum communication device, in accordance with one embodiment of the present invention. The functions are arranged in a time-sequence manner where the output of one function is provided as the input to the adjacent function. These three modes are exemplary, and the present invention is well suited to using a wide variety of function sequence modes.

Block diagram 300c includes three separate and distinct user-defined modes of operation, e.g., a first mode, mode (1) 311, a second mode (2) 312, and a third mode (3) 313. In one embodiment, first mode 311 corresponds to an exemplary legacy protocol, while user mode (2) 312 corresponds to a CDMA 2000 protocol, and user mode (3) 313 corresponds to a 3GPP protocol.

Figure 3C:
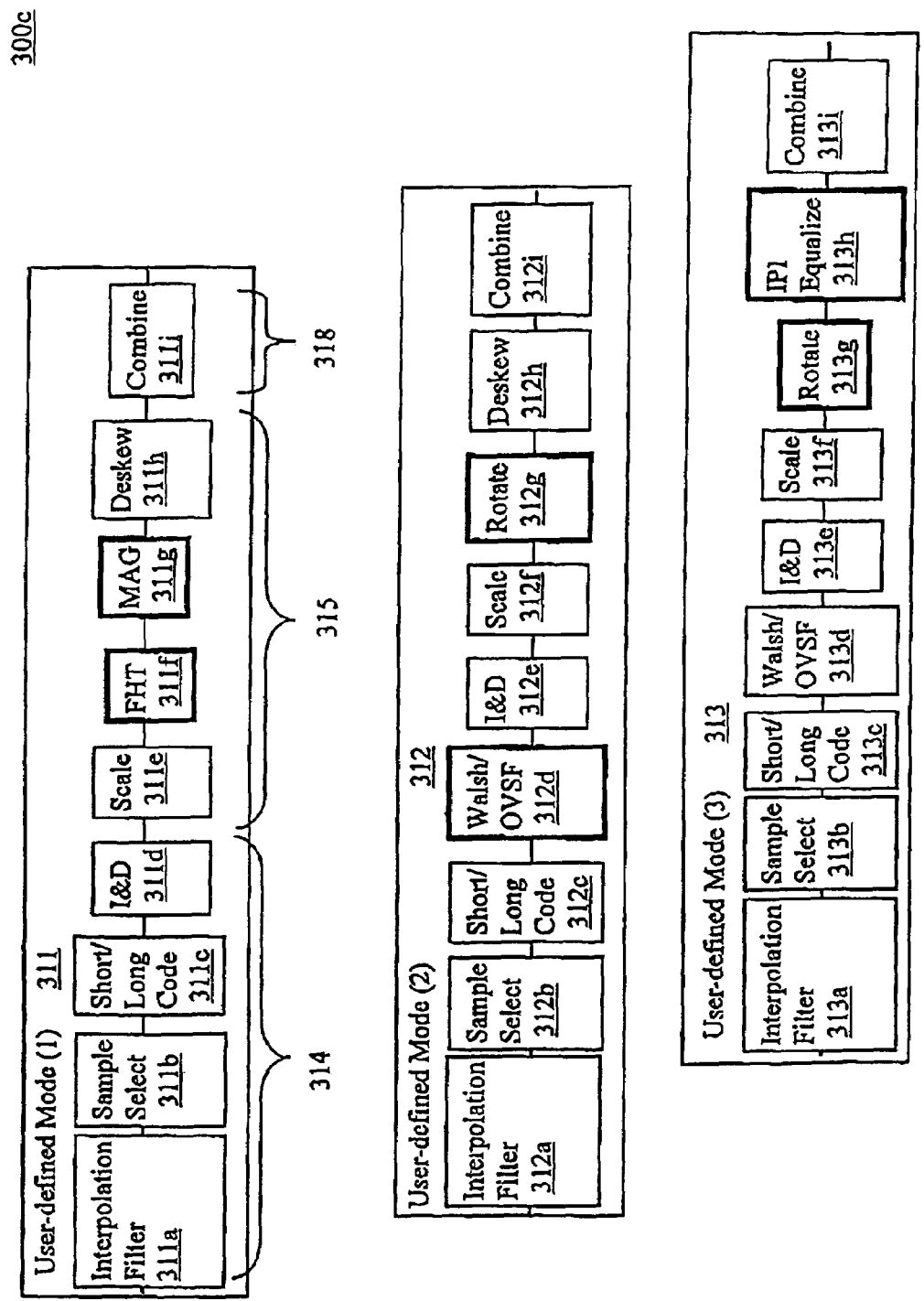
FIG. 3C is a block diagram of the codec functions accommodated by the electronic spread spectrum communication device, in accordance with one embodiment of the present invention.

Many functions are common to all three modes. For example, Interpolation filters 311a, 312a, and 313a are common to all three modes. However, other functions are unique and separate for a given mode. For example, rotate function 312g and 313g are not included in mode (1) 311. The explicit functions shown in FIG. 3C are as follows:

User Mode (1) 311 includes: an interpolation filter 311a, a sample select function 311b, a short/long code 311c, an integrate and dump (I&D) function 311d, all of which can be grouped as a chip-rate functions 314. User mode (1) 311 also includes: a scale function 311e, a fast Hadamard transform (FHD) 311f, a magnitude (MAG) function 311g, a deskew function 311h, all of which can be grouped as symbol-sequence functions 315. Lastly, user mode (1) 311 includes a combine function 311i, which is a channel-element processor function 318. All the functions listed for user mode (1) 311 are coupled to each other in a serial manner.

User Mode (2) 312 includes: an interpolation filter 312a, a sample select function 312b, a short/long code 312c, a Walsh/Orthogonal Variable Spreading Factor (OVSF) code function 312d, an I&D function 312e, a scale function 312f, a rotate function 312g, a deskew function 312h, a combine function 312i, all coupled to each other sequentially.

User mode (3) 313 includes: an interpolation filter 313a, a sample select function 313b, a short/long code block 313c, a Walsh/OVSF function 313d, an I&D function 313e, a scale function 313f, a rotate function 313g, an inter-path interference (IPI) equalize function 313h, and a combine function 313i.

Figure 3D:
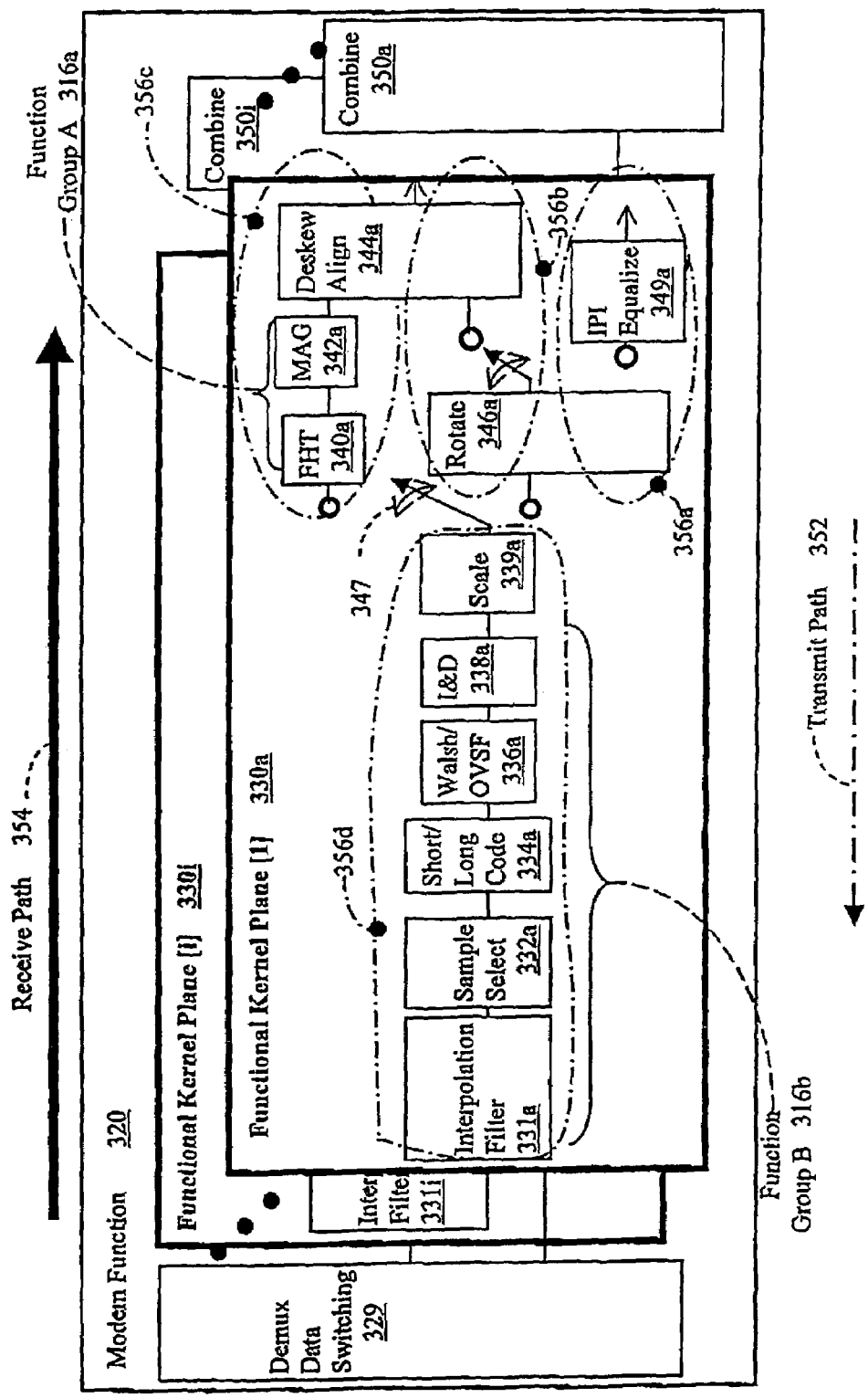
FIG. 3D is a block diagram of the modem functions accommodated by the electronic spread spectrum communication device, in accordance with one embodiment of the present invention.

Referring now to FIG. 3D, a block diagram of the modulation/demodulation (modem) functions accommodated by an electronic spread spectrum communication device is shown, in accordance with one embodiment of the present invention. FIG. 3D illustrates a configurable functional plane with serial and parallel functional capabilities that provide the flexibility, speed and efficiency required accommodating a wide range of modem functions for different communication protocols. FIG. 3D also illustrates the concept of parallel processing in multiple functional planes to accommodate high channel density in a communication system. Exemplary modem functions, for which hardware kernels can be configured, are described hereinafter in Appendix A, entitled "Data Kernel Specification List." FIG. 3D provides function groups for a Receive path 354 only.

The present embodiment of modem function block 320 includes multiple functional planes, e.g., functional kernel planes [1] 330a and [i] 330i that represent the functions required and performed by kernels for a given application. In the present embodiment, the functions provided are for an exemplary cellular spread spectrum application. Each functional plane represents the capabilities of a configurable demodulating finger hardware kernel plane. While the present embodiment shows only two functional planes, the present invention is well suited to using any number of functional planes, as appropriate for a given application. In the present embodiment, functional planes [1] 330a through [i] 330i perform modem functions for any one of a multitude of different communication protocols, e.g., IS2000, 3GPP, as well as anticipated future protocols. While the functions listed in the present embodiment are focused towards CDMA, the present invention is well suited to implementing functions that are applicable to time division multiple access (TDMA) protocol, whose functions are known by those skilled in the art. The specific communication protocol implemented in a functional plane depends upon how the functional plane was configured, which is described in a subsequent flowchart.

Functional kernel plane 330a includes a sequential arrangement 356d of sub functions of the modem function that are common to multiple communication protocols to be accommodated by a communication device. Functional plane [1] 330a also includes a parallel arrangement, 356a through 356c, of sub functions that are unique to one or more of the multiple communication protocols. By using this arrangement, the present invention can accommodate any of the multiple communication protocols efficiently, and can quickly change between different protocols. Note that the specific choice of which functions of the multiple communication protocols to include in sequential arrangement and which functions to include in parallel arrangement is a complex task that evaluates the trade-offs between flexibility, speed, and efficiency of the overall architecture of the communication device. In an alternative embodiment, some functions that are common to different protocols may be included in a parallel functional block arrangement.

Sequential arrangement 356d of sub-functions in functional plane [1] 330a includes the following sub function blocks: 1) interpolation filter block 331a; 2) sample select block 332a; 3) short/long code block 334a; 4) Walsh/orthogonal variable spreading factor (OVSF) block 336a; 5) integrate and dump (I&D) block 338a; and 6) scale block 339a. Sequential arrangement 356d of sub-functions represents the common functions that are used in multiple communication protocols. Thus, for example, WCDMA and some other 3-GPP applications can use the sub-functions listed in sequential arrangement 356d.

Following scale block 339a of sequential arrangement 356d, three groupings of possible parallel arrangements of functional blocks can be chosen, by flexible coupling 347. Each grouping represents a unique configuration of functions required by one of multiple communication protocols accommodated by the present embodiment. A first grouping 356a includes a fast Hadamard transform (FHT) block 340a followed by a magnitude calculation block 342a and a deskew/align block 344a, as required for an exemplary communication protocol. A second grouping 356b includes a rotate block 346a followed by a deskew and align block 347a (that is common between path 356c and 356b), as required by 3GPP and CDMA-2000 communication protocol. Finally, a third grouping 356c includes a rotate 346a block (that is common for path 356b and 356a) followed by an inter-path interference (IPI) block 349a, as required by the 3GPP communication protocol. Each of the three possible groupings, 356a through 356c, transmits its results to a combining block 350a associated with each functional plane. Function blocks 331a through 339a of sequential arrangement 356d are common to the extent of their functional category; each function has parameters that can be varied for different protocols that use that function and for changes over time for a given protocol. While the present embodiment of sequential arrangement 356d and parallel arrangement 356a through 356c provides a specific type, quantity, and sequence of functions for a given range of communication protocols, the present invention is well suited to using a wide range of functions in each arrangement. Furthermore, the present invention is well suited to narrowing or expanding the scope, application, and protocols accommodated by the functions.

In the present embodiment, additional functional planes, e.g., functional plane [1] 330a through plane [1] 330i, include the same functions, e.g., interpolating filter block 331a and 331i. Thus, every functional plane in modem function block 320 is equally configurable with the full flexibility to accommodate each of the communication protocols. In another embodiment, one or more functional planes have functional capabilities that are different from each other. For example, in one embodiment, each functional plane in modem function block 320 has the ability to handle different subsets of the superset of communication protocols accommodated by the overall communication device. Thus, one functional plane can be configured to accommodate IS2000 and CDMA-2000 communication protocols, while another functional plane is configured to accommodate a legacy communication protocol.

Because a functional plane can accommodate multiple communication protocols, it is configurable to a desired protocol. On a larger scale, each of the multiple functional planes can be configured to accommodate the same communication protocols at a given time, or to accommodate different communication protocols at a given time. Thus, for example, functional planes [1] 330a and [i] 330i can be configured to both perform a CDMA-2000 protocol at a given point in time. Alternatively, functional planes [1] 330a and [i] 330i can be configured to perform different communication protocols at a given point in time, e.g., functional plane [1] 330a is configured to perform CDMA-2000 protocol while functional plane [i] 330i is configured for a legacy communication protocol.

One aspect of the configurabiltiy of a functional plane of FIG. 3D, is that the configuration itself can change, e.g., it can be reconfigured. The independent variable associated with the change can be time, a channel designation, or some other user-defined variable. The time variable can be a long or short temporal designation, e.g., years, months, or even milliseconds. Furthermore, the reconfigurability of the functional planes is dynamic in one embodiment, e.g., the reconfiguration occurs while other functional planes are operating. The configuration data used to designate the functions and protocol accommodated may be communicated via wireless transmission of configuration data along with the data, or by loading pre-stored configuration data on communication device. In this manner, the present invention provides a temporal and functional range of granularity for the functional planes of the communication device that are definable by a user.

Receive path 354 shows the direction of data flow through functional blocks 329 through 349 in a modem function plane 330a. In this manner, the modem function block 320 can accommodate both directions of data traffic, by time-sharing the functional resources.

In the present embodiment, multiple functional planes, e.g., 330a through 330i, are physically implemented in a single configurable modem processor block, e.g., block 102a of FIG. 1B. As an example, function group A 316a, which includes FHT function 340a and Mag function 342a, and function group B 316b, which includes interpolation filter 331a, sample select block 332a, short/long code 334a, Walsh/OVSF block 336a, and I&D block 338a, are implemented in specific subcomponents, e.g., algorithmic-specific kernels, of modem kernel plane 102a of FIG. 1B, as described in subsequent figures. Furthermore, the methods of configuring, selecting, and arranging functions in modem block 320 are described in subsequent flowchart figures. However, the present invention is well suited to a wide variety of physical implementations via a wide range of methods.

Thus, a channel element can be built-up by the user from the set of reconfigurable kernels to realize a reconfigurable multi-channel CDMA digital base band modem signal path that performs all the digital modulation-demodulation as well as channel encoding-decoding required per logical channel for all narrowband and wideband CDMA standards. Some possible configurations that a user can realize by configuring the hardware kernels and the configurable interconnect in the communication device are summarized below, for the forward (downlink) and reverse (uplink) links:

Forward Link
  1xRTT evolution (IS-2000)—all radio configurations as described in TIA/EIA IS2000.2
  3xRTT multicarrier mode
  3GPP 3.84 MHz Direct-Spread Mode (FDD)
  ARIB 4.096 Mcps WCDMA
Reverse Link
  1xRTT evolution (IS-2000)—all radio configurations as described in TIA/EIA IS2000.2
  3GPP 3.84 MHz Direct-Spread Mode (FDD)
  ARIB 4.096 Mcps WCDMA The present modem functional block diagram 320 can be realized by providing parallel identical channel elements, where each channel element one or more fingers, for a total number of fingers appropriate for a given application (e.g., user density, etc.). With each channel element in receive path 354 consisting of configurable and programmable kernel engines for despreading, demodulating, parameter estimation, and combining. Modem signal processor function block 320 offers a communication system with many effective fingers, allowing a very high level of channel integration, while allowing the communication system to employ proprietary algorithms to improve radio link performance, as will be described hereinafter. Each channel element, including its definition and structure, is completely under the communication system's control using the mixed programming granularity to control dataflow, controlflow, and interconnect. This process is discussed in more detail for a subsequent flowchart figure.

Transmit path 352 is configured with multiple channel elements in the present embodiment, thus enabling maximal use of forward-link capacity per sector in multicarrier systems. The architecture of the modem signal processor 102a of FIG. 1B is such that it enables the system designer to program the chip at many levels, including control of specific datapaths to realize different algorithms. A hierarchical Application Programming Interface (API) that supports several levels of user control for the modem signal processor is described in co-pending patent application entitled "A METHOD FOR DESIGINING A CONFIGURATION FOR A CONFIGURABLE SPREAD SPECTURM COMMUNICATION DEVICE."

Based on the similarity of the functions across different user-defined modes in FIG. 3C, the design of configurable hardware kernels can be determined, as described in a subsequent flowchart figure. For example, all three of these modes can be configured to run on a single communication device, e.g. device 100 of FIG. 1b. In the present embodiment, all three user-modes may appear to exist independent of each other. However, in reality, a functional implementation of the three different modes can selectively exist on each of the multiple functional planes, e.g., function planes [1] 330a through [i] 220i, of FIG. 3D. In this embodiment, the similar aspects of all three user modes are included in sequential function block 356d of FIG. 3D, with the non-similar functional aspects of the three user modes provided in the three parallel function blocks 356a through 356c.

The three parallel function blocks (or paths) 356a through 356c of FIG. 3D can be intermittently selected to provide a sequentially varying configuration protocol within a given functional kernel plane, e.g., time-sharing the resources. Alternatively, different functional kernel planes can be configured to different communication protocols depending upon the communication traffic or user needs. Additionally, different functional kernel planes can be configured to perform different portions of the functions. For example, functional kernel plane 330a can be used to handle all the sequential communication functions 356d for all three different modes, while functional kernel plane 330i can perform one or more of the sequential functional blocks 356a through 356c. With all these scenarios, hardware kernels are used to implement these functional sequential and parallel blocks, as described in a subsequent figure.

Figure 4:
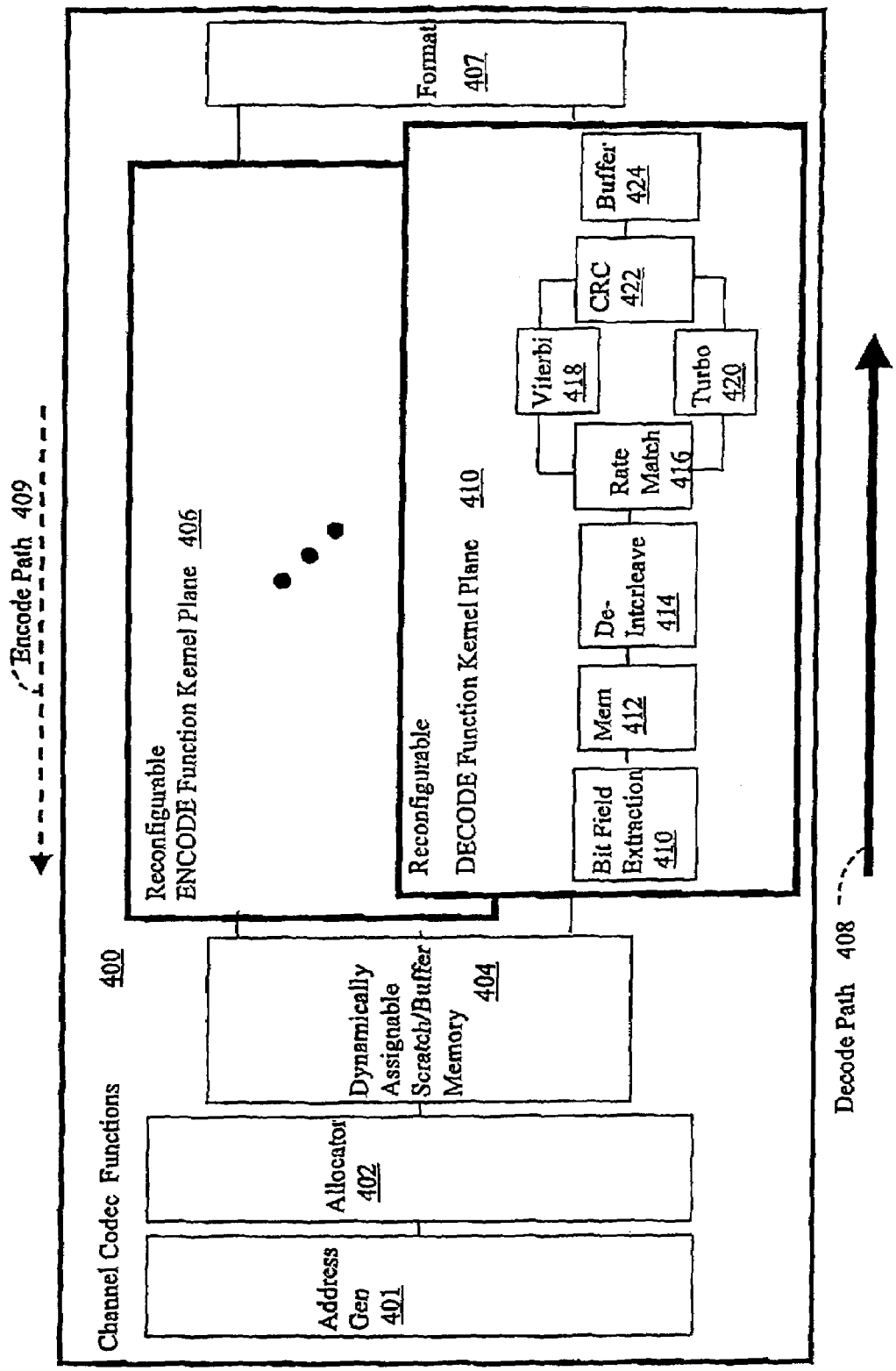
FIG. 4 is a block diagram of several user-defined modes of operations performed for modem signal processing functions in the electronic communication device, in accordance with one embodiment of the present invention.
Figure 5:
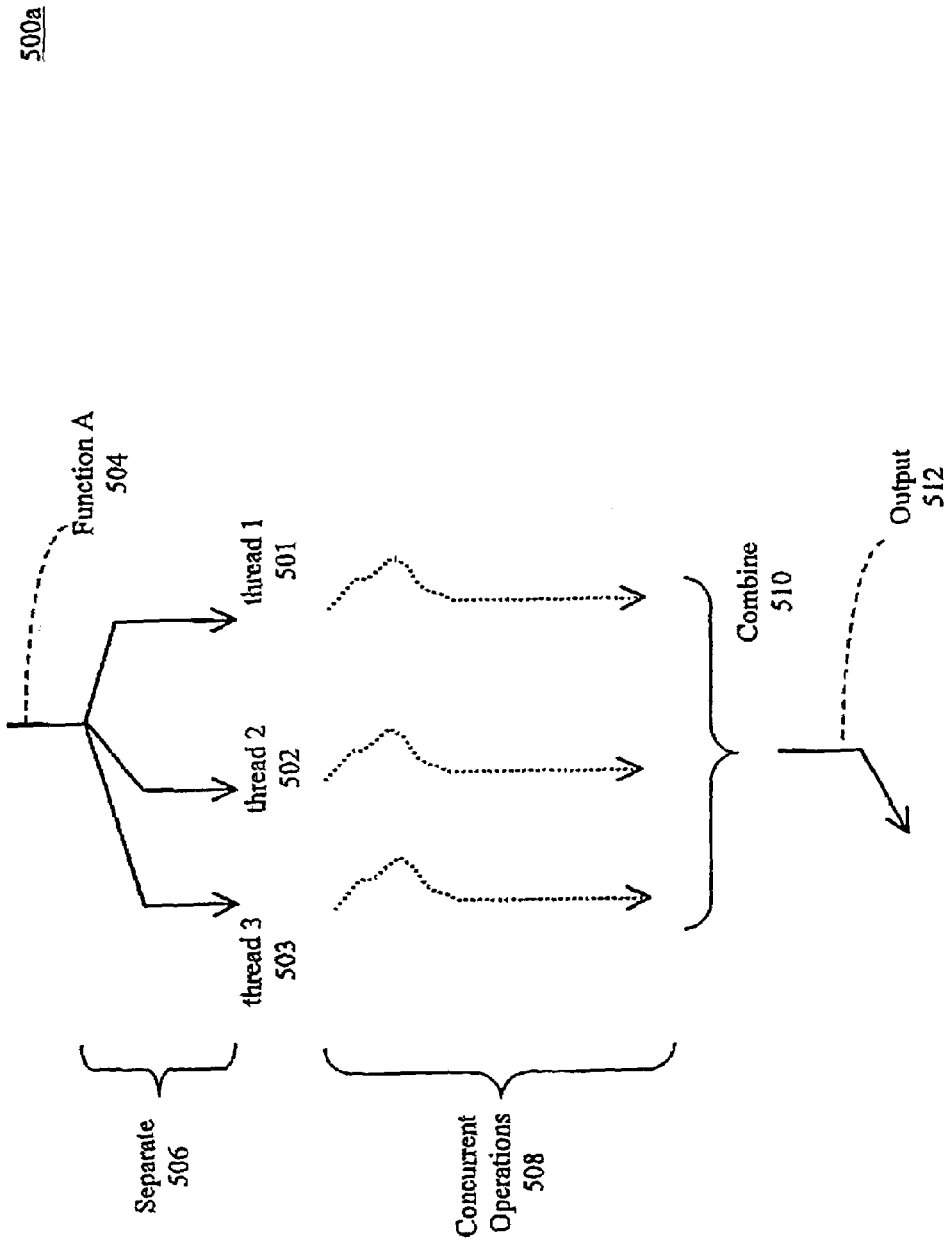
FIG. 5 is a diagram of the separation and combining process of a single thread into multiple concurrent threads to be accommodated on the communication device, in accordance with one embodiment of the present invention.

Referring now to FIG. 4, a block diagram of encode/decode (codec) functions accommodated by the electronic spread spectrum communication device is shown, in accordance with one embodiment of the present invention. FIG. 3C illustrates a configurable functional plane with functional capabilities that provides the flexibility, speed and efficiency required to accommodate a wide range of codec functions for different communication protocols. FIG. 3C also illustrates the concept of parallel processing in multiple functional planes to accommodate high channel density in a communication system. Functions in FIG. 4 relate to an exemplary spread spectrum communication system of cellular telephony.

Codec function block 400 includes an address generator block 401 coupled to an allocator function block 402, in turn coupled to dynamically assignable scratch/buffer memory 404, such as random access memory (RAM), in the present embodiment. Dynamically assignable scratch/buffer memory 404 is coupled to each of the multiple possible configurable decoder functional planes. Allocator function block is implemented by allocator hardware block 219 of FIG. 2A, which includes state machine components and memory that is chosen and coupled in a manner to manage multiple functional planes, e.g., planes 406 and 410. The configuration of the allocator components can vary depending upon the protocol implemented in the multiple functional planes, e.g., planes 406 and 410. Dynamically, a single scratch/buffer memory 404 is operational to provide configuration and state information as required for configuring and sharing resources in the multiple functional planes 406 and 410.

The present embodiment of codec function block 400 includes a single functional kernel plane for a given data flow direction, e.g., decode functional plane 410 for decode data path 258, and encode function plane 406 for encode data path 259. Each functional plane utilizes configurable codec hardware kernels to accommodate their different functions, which are described hereinafter.

As an illustration, decode functional plane 410 includes an exemplary arrangement of sub functions for a decode path 408 to translate encoded received data into a data signal, per an appropriate communication protocol for the desired application. The arrangement of functions includes, in one embodiment, a bit field extraction block 410 coupled to a memory block 412, which is then coupled to deinterleaver block 414, which is in turn coupled to rate matching block 416. Rate matching block 416 is coupled in parallel to Viterbi block 418 and to Turbo decoder block 420, both of which are then coupled to provide data to cyclic redundancy checker (CRC) block 422. Lastly, CRC block 422 is coupled to buffer 424. A similar, complementary coupled arrangement of sub-functions exists on encode functional kernel plane 406, but is omitted for clarity.

The function blocks provided in FIG. 4 can be implemented on corresponding individual hardware kernels, e.g., kernel K1 261a through K6 266a. However, some functions may share a common hardware kernel if the types of operations (e.g., math operations) and the processing rate (e.g., symbol rate) are similar enough and if scheduling of the hardware kernel and the data flow through the hardware kernel are satisfactory.

Decode function kernel plane 410 includes other user-configurable decoder functions, described hereinafter, for convolution decoding and turbo decoding. The basic function of convolution decoding and turbo decoding is known by those skilled in the art. The convolution decoder function has the following user-programmable (or user-configurable) parameters: code polynomial; code (R, K), with K=5-9, data rate; blind rate-detection for voice channels; rate matching. Convolution decoder function also has user-programmable depuncturing pattern, traceback method, and soft-decision output. Turbo decoder function has user-programmable: code polynomials (K=3,4); data rate; block size (up to 6120); number of iterations; termination conditions; decoding metric (max-log-MAP, user-specified correction table); input scaling; traceback method; and depuncturing pattern.

In contrast, encode functional plane 406 includes a sequential arrangement of functions, or sub functions, (not shown for clarity) for an encode path 409 to translate data into an encoded signal, per an appropriate communication protocol of the desired application. Encode path 409 shows a data path direction through codec function block 400 that is opposite that of decode path 408. In this manner, the codec function block 400 can accommodate both directions of data traffic, by time-sharing the functional resources. A wide range of common functions, implemented serially, and a wide range of diverse functions, implemented parallely, for the wide range of spread spectrum applications can be obtained from the operating specifications for these different protocols. In particular, transmit encoder path 409 of FIG. 4 includes user-configurable encoder kernels for convolution encoding and turbo encoding. The following functions make up the encoding kernels: Convolution Encoder function and turbo encoder function; convolution encoder includes the following user-programmable parameters: code polynomial (R, K), with K=5-9; rate matching; puncturing pattern. Turbo encoder includes user-programmable: code polynomials (K=3,4); data rate; block size; rate matching; puncturing pattern. The specific function block descriptions implemented by reconfigurable decoder plane 406 include deinterleaver controller, turbo decoder, and convolution decoder. Appendix A, provided hereinafter, describes the specifications for the decode and encode functions implemented in the hardware kernels. It is appreciated that one skilled in the art understands the references to CDMA and communication signal variables and protocols within Appendix A.

The Channel Codec function plane 400, as implemented in Channel Codec Signal Processor 104 of FIG. 1B, operates under the following criteria, in one embodiment:

A maximum of 32 logical channels are available per carrier per configuration

A configuration, as defined as a radio channel configuration, maps directly onto one thread of processing on the Channel Codec Signal Processor Type of channel specified by BTS channel card controller.

Multiple radio channel configurations must be supported across a multiple standards, including all radio configuration characteristics for the reverse channel in derivative systems (Radio Configurations 1-6) as well as ARIB and 3GPP Direct-Spread FDD (Radio Configurations based on Service Class and Associated User Data Rate).

BTS Channel Card Controller will interface to the BTS Cell Controller for sending and receiving control information associated with call setup, teardown, and handoff.

The BTS Cell Controller will not demand a grand total of channel bandwidth beyond the capacity of the Channel Codec Signal Processor(s). If this cannot be guaranteed, then a protocol on dropping channels beyond the capacity limit must be specified.

Assignments for radio configurations for specific channels will be made prior to the arrival of the frame; i.e. assignments for FRAME (N) will be sent prior to the arrival of FRAME (N).

The logical channel assignments for a physical channel (for the BTS) can be changed during the course of a call at any FRAME boundary.

Physical channels may request a larger bandwidth or smaller bandwidth for the same assignment during the course of a call.

Logical channel assignments will be maintained so there are no holes in the assignment table. This provides the capability for adding the largest (widest) new channel assignment within the remaining capacity.

Channel assignments and deassignments require one time slot (only one assignment or deassignment per time slot). This assumes cleanup occurs upon every assignment/deassignment.

Resource consolidation/defragmentation will be performed immediately after a deassignment or assignment.

While the present embodiment shows only two functional planes, the present invention is well suited to using any number of functional planes, as appropriate for a given application. In the present embodiment, functional planes 406 and 410 can be configured to perform codec functions for a wide range of spread spectrum communication applications, as described hereinabove. For example, in one embodiment, multiple functional planes (not shown) for both encoding and/or decoding can exist. In the present embodiment, additional functional planes for a given data flow, e.g., decoding path 408, include the same functions for decoding. Thus, every functional plane in codec functions is equally configurable with the full flexibility to accommodate each of the communication protocols. In another embodiment, one or more functional planes have functional capabilities that are different from each other. For example, in one embodiment, each functional plane in codec function block 400 has the ability to handle different subsets of the superset of communication protocols accommodated by the overall communication device. Thus, one functional plane can be configured to accommodate IS-95 and CDMA-2000 communication protocols, while another functional plane is configured to accommodate WCDMA and 3GPP. All the functional planes can be physically implemented in a single codec hardware processor block, e.g., block 104 of FIG. 1B, in the present embodiment. However, the present invention is well suited to a wide variety of physical implementations. The configurabiltiy and dynamic reconfigurability of codec functional planes is also described in subsequent flowcharts.

Referring now to FIG. 5, a diagram of the separating and combining process of a single thread into multiple concurrent threads to be accommodated on the communication device is shown, in accordance with one embodiment of the present invention.

The model for computation using the reconfigurable multiprocessor architecture of the present invention starts from the model of a single thread representing Function A 504, which is initialized on a microprocessor or digital signal processor, e.g., processor 112 of FIG. 1B. Several application-specific processing threads, e.g., thread 1 501 through thread 3 503, are split off in the pre-processing stage. For example, in one embodiment, function A 504 is a modem function within a given application, e.g., a wireless communication protocol such as CDMA IS-95. Function A 504 includes multiple sub functions that can be performed in series or in parallel.

The sub functions that are performed concurrently, e.g., in parallel, are referred to as a threads, e.g., thread 1 501, thread 2 502, and thread 3 503, for the modem function A 504. The number of threads can vary in different embodiments, according to the operations required by a given function or sub function, and their need to be performed concurrently, e.g., defined by a communication protocol in the present embodiment. Concurrent operations 508 are performed on each of the respective threads 501-403 in a communication device, according to the sub function requirements. Thereafter, the threads are terminated with the provision of data and control is returned the microprocessor. Each thread can be implemented on an autonomous configurable kernel in the present embodiment. A processor 112 along with an optional allocator 219, as shown in FIG. 2A, can initiate or manage the separating and combining operations.

The chronological sequence of events for the function of separating and combining functions/sub functions is provided in a subsequent flowchart figure. In one embodiment, a modulation function can be broken down into concurrent sub function on data, such as interpolation filter, sample select, short/long code generation, etc. Similarly, each sub functions can be broken down into multiple concurrent operations. For example, a filter interpolation requires operations such as data fetch, addition, decision logic, etc.

Flowchart Implementation of Processes

Figure 6A:
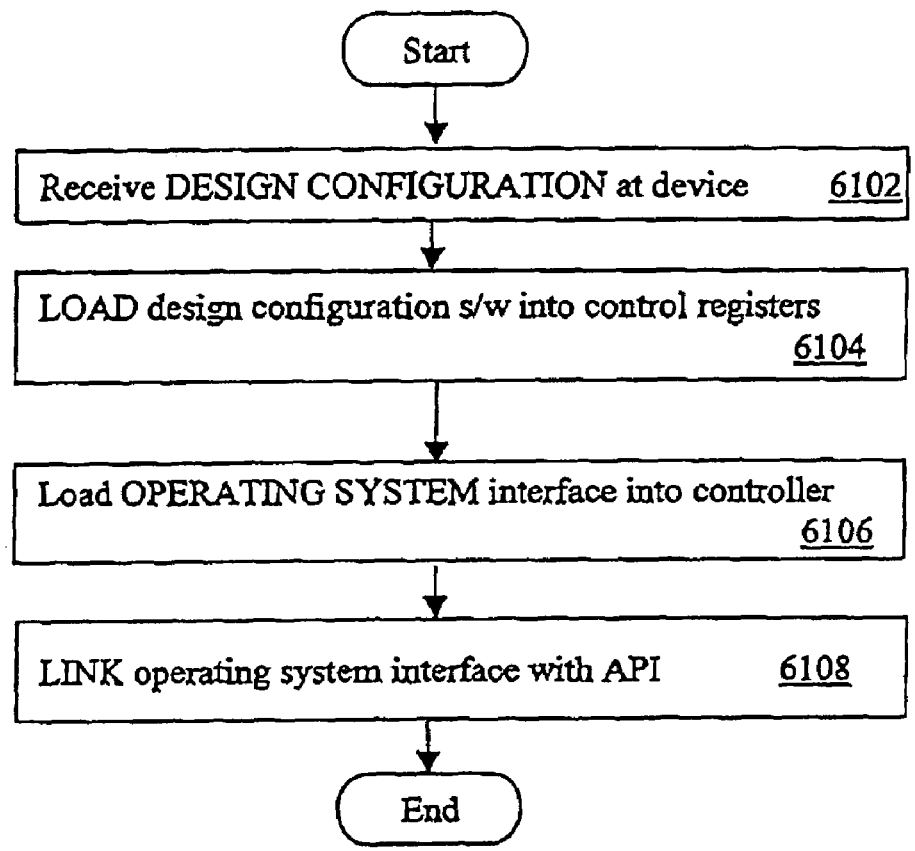
FIG. 6A is a flowchart of the process used to implement a design configuration onto a configurable spread spectrum electronic communication device, in accordance with one embodiment of the present invention.

Referring now to FIG. 6A, a flowchart 6100 of the process used to implement a design configuration onto a configurable spread spectrum electronic spread spectrum communication device is shown, in accordance with one embodiment of the present invention. By using the flowchart embodiment of the present invention, a configurable electronic device can be configured to a user-specific design configuration. In this manner a significant amount of control over the operation and function of the configurable device is provided to the user. The implementation of the design into the device is direct and convenient, thus providing timely flexibility in a field where protocols can change quickly and frequently. Flowchart 6100 is implemented, in general, by communication device 100 of FIG. 1B and VMI 150 of FIG. 1D, as well as diagrams of components as shown in FIGS. 2A through 2G.

Flowchart 6100 begins with step 6102. In step 6102 of the present embodiment, a design configuration is received at a configurable device. For example, a design configuration for a configurable communication device can be a 3GPP-specific configuration, implemented by user-specified proprietary algorithms, in one embodiment. Additional description on the process for designing a configuration for a configurable device is provided in co-pending patent application entitled "A METHOD FOR DESIGINING A CONFIGURATION FOR A CONFIGURABLE SPREAD SPECTURM COMMUNICATION DEVICE."

Step 6102 is implemented, in one embodiment, by providing design configuration data, e.g., from configuration mappings input 174 of FIG. 1D, to configuration information block 272 of a hardware kernel K1 261a via reconfiguration bus 206a. More than one configuration can be provided in one embodiment. In this case, a configurable device can be partitioned to perform multiple protocols, having a unique configuration for one or more functions, within a single communication device. The partitioning can be static amongst the hardware, or can be dynamic, e.g., in the case of time-shared configurable hardware kernels. The configuration information can also contain information to provide options, e.g., quality of service (QOS) when implementing the function for a given user, or channel in the communication device. The transmission of the design configuration can either be via wired or wireless coupling.

While the present embodiment for step 6102 provides a specific location of configuration information block 272 and a specific route, e.g., reconfiguration bus 206a, in which it is downloaded to a hardware kernel, the present invention is well suited to using alternative components and interconnects to implement step 6102. By providing the configuration information at a level that is local, e.g., in terms of spatial and control aspects, to the individual hardware kernel, the present embodiment provides effective local processing that is autonomous, in varying degrees, to the balance of the host device. In this manner, the present invention is able to provide efficient and flexible parallel processing of data.

Step 6102 can be implemented by receiving desired configurations for hardware kernels, e.g., kernel 261a of FIGS. 2C through 2F, in communication device 100 of FIG. 1B, via a variety of embodiments. For example, in one embodiment, configuration information is received via wired communications with a computing device, e.g., a workstation. In another embodiment, configuration information can be provided by an electronic storage medium, e.g., CD-ROM. In yet another embodiment, configuration information is received by wireless transmission from another communication device via antenna 120. Furthermore, configuration information is provided at the time communication device 100 is manufactured and/or initially programmed for operation in the field, in the present embodiment. However, in another embodiment, configuration information is dynamically implemented at a time communication device 100 is in operation in the field. Configuration information is received, processed, and implemented via system processor 112 (or BTS card controller 110a) and system memory 118, which then communicates the information and instructions via bus, e.g., bus 127 of FIG. 1C, to configurable processors, e.g., configurable modem processors 102a and 102b and configurable codec processor 104. Within the configurable processors, local memory, e.g., configuration memory 272, and local controller, e.g., controller 271 of FIGS. 2D and 2E, can control implementation of configuration information to, and operation of, hardware satellite kernels, e.g., satellite kernel 270, in the present embodiment. Following step 6102, flowchart 6100 proceeds to step 6104.

In step 6104 of the present embodiment, design configuration software (s/w) is loaded into control registers. Step 6104 is implemented, in one embodiment, by storing design configuration data in configuration information block 272 of the appropriate hardware kernel. Card controller 110a or processor 112 of communication device 100 in FIG. 1B can direct the configuration information to the appropriate control register addresses within configuration information block 272 of FIG. 2D as identified by an off-line mapping operation, e.g., a programming interface (or programming tools) on a separate workstation. In this manner, a hardware kernel designed for integrate and dump functions will receive the configuration software information related to integrate and dump functions.

Steps 6104 and 6102 can be implemented by receiving a computer program with data and instructions for configuring the configurable spread spectrum electronic communication device. Exemplary computer programs for configuring modem and codec functions in the configurable spread spectrum electronic communication are provided in Appendix B hereinafter. The exemplary computer programs provide an implementation file that defines a modem finger function by defining: the sequence of operations; the parameters that control the dataflow; and the parameters that control the initiation or termination of the function. Thus, a specific finger behavior is realized below by building the finger using the principle of an extensible data type. The sequence of operations that define a finger are determined by the user, and then declared as the finger type. The user then declares the parameters that will control the dataflow and then define the initiation and termination conditions. It is appreciated that one skilled in the art can interpret the computer language specific syntax provided in this examples of Appendix B. This example demonstrates how a user can realize a specific level of control over the functional operation of the hardware kernels. Thus, controllability, observability, and new configurations and behaviors can be realized via using the extensible data types of the present invention. Thus the present invention overcomes limitations associated with the static prior art configuration for communication devices.

The configuration data and computer program having instructions to implement the configuration data are implemented by a virtual machine interface (VMI), in the present embodiment, that quickly and efficiently translates the computer language information to the appropriate configuration mappings. FIG. 1D provides an exemplary VMI 150 for interfacing configurable components, e.g., configurable modem processor 120*a* and configurable codec processor 140 of configurable communication device 100, as shown in FIG. 1B. In particular, I/O device driver block 166 contains the respective drivers for the algorithmic-specific hardware kernels (or satellite kernels) described in FIGS. 2C through 2G. For example, if hardware kernel block K1 261*a* through K6 266*a* of FIG. 2C have architectures that are designed for demodulation functions, then the necessary drivers for each of these hardware kernel blocks will exist in I/O device drivers block 166. These drivers will be used to configure the hardware kernels and implement the desired functions. Device drivers can exist for all the functions covered by a given application, e.g., for communication device 100 of FIG. 1B. FIG. 1D provides additional description of the VMI operation. Following step 6104, flowchart 6100 proceeds to step 6106.

In step 6106 of the present embodiment, an operating system interface is loaded into a controller. Step 6106 is implemented, in one embodiment, by receiving the operating system interface, as determined by a configuration design process. The controller receiving this information can range from: BTS card controller 110*a* of FIG. 1B; BTS cell controller 114 of FIG. 1C; allocator (controller) 219 of FIG. 2A; and the individual hardware kernel controllers, e.g., controller 271 of FIG. 2D, in each of the hardware kernel planes, e.g., plane [1] 201*a* through plane [i] 201*i*.

In particular, BTS Channel Card Controller 110*a* (or an optional DSP) hosts the software stack developed by the user, e.g., per a configuration design process for a configurable device, that includes a standards-driven OSI Layer 1 Modem software stack. This software controls the operation of a modem signal processor, e.g. configurable modem processor 102*a*, and a Channel Codec Signal Processor, e.g., codec processor 104. This software stack exploits the full power of an Application Programming Interface (API) for the wireless spread spectrum communication platform to realize efficient radio link performance for each channel via a user's proprietary signal processing techniques. In this manner, the present embodiment effectively employs a hierarchy of controllers for providing configuration information and control information that will allow the autonomous operation of the individual hardware kernels. This allows for efficient parallel processing, with the benefit of reconfigurability. Following step 6106, flowchart 6100 proceeds to step 6108.

In step 6108 of the present embodiment, the operating system (OS) interface is linked with the API. Step 6108 is implemented, in one embodiment, by linking the appropriate set of interfaces from the API, e.g., from API inputs 172 of FIG. 1D. The OS interface data and the API inputs can be stored in memory 118 on communication device. Step 6108 effectively reconciles the two interfaces such that the OS of the communication device can implement the functions desired on the appropriate hardware kernels, as provided in a configuration design process. Following step 6108, flowchart 6100 ends.

Figure 6B:
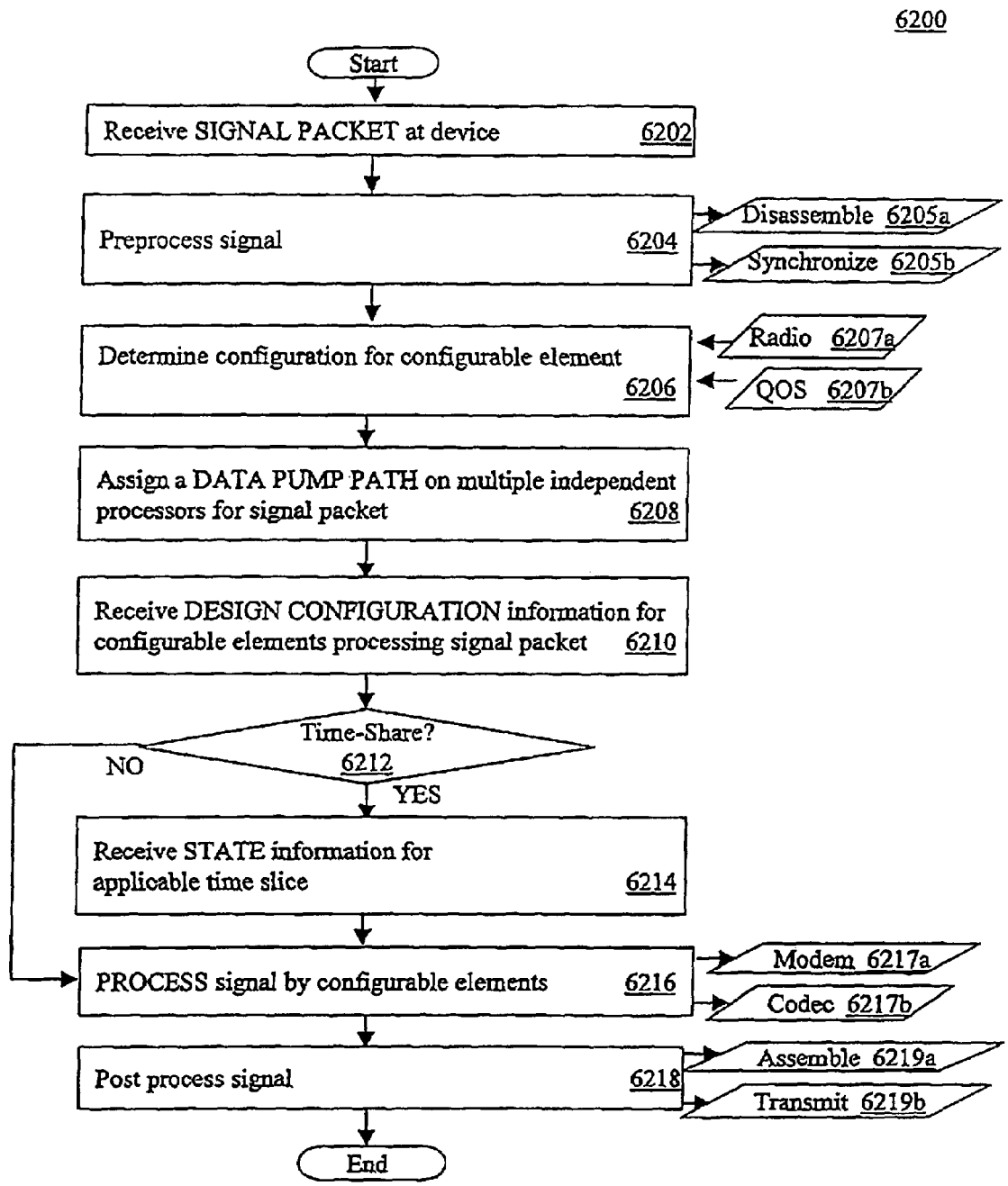
FIG. 6B is a flowchart of the process used to operate a configurable spread spectrum electronic communication device, in accordance with one embodiment of the present invention.

Referring now to FIG. 6B, a flowchart 6200 of the process used to operate a configurable spread spectrum electronic spread spectrum communication device is shown, in accordance with one embodiment of the present invention. By using the flowchart embodiment of the present invention, an application with different protocols can be provided for in a configurable electronic device. Consequently, the present invention provides a method for designing efficient and intelligent flexibility into a configurable device to accommodate current differences and protocol as well as future protocol changes. Flowchart 6200 is implemented, in general, using the functional block diagram of FIG. 1D and the hardware block diagrams of FIGS. 1A through 1C, and FIGS. 2A through 2F.

Flowchart 6200 begins with step 6202. In step 6202 of the present embodiment, a signal is received at a configurable electronic device for processing. Step 6202 is implemented, in an uplink transmission from a mobile to a BTS, by a communication device, e.g., device 100 of FIG. 1B, receiving a signal via wireless radio frequency (RF) transmission. The signal can be a continuous signal, as appropriate for CDMA systems, or a signal having time-divided packets therein, as appropriate for TDMA systems. And the sending and the receiving devices could be a base transceiver station (BTS), a mobile unit, or a test platform. Furthermore, the signal can include data information, control information, configuration information, and options for implementing configuration information. In particular step 6202 is implemented in one embodiment by receiving signal on antenna 120 and communicated by bus 129 to communication device 100, as shown in FIG. 1B.

In a downlink embodiment for step 6202, a MTSO traffic interface sends voice, data, and control data packets, via bus 128 to the transmit-data-pump path in CDMA BTS Modem Platform communication device 100 according to the configuration specified by the BTS Cell Controller 114 for that specific payload, as shown in FIG. 1B. In an uplink embodiment for step 6202, the communication device 100, under control from the BTS Card Controller 110*a*, assigns a signal source to a receive-data-pump path in the modem signal processor. Following step 6202, flowchart 6200 proceeds to step 6204.

In step 6204 of the present embodiment, the signal is preprocessed. Step 6204 is implemented, in one embodiment, by performing preprocessing steps that prepare a signal for the core processing to be performed by the reconfigurable hardware kernels of the communication device. For example, in a downlink scenario, one embodiment of step 6204 includes preprocessing steps such as disassembly of the signal and synchronization of signal with over the air timing. Pre-processing can also include demuxing and sector-by-sector combining in the cases where channels from different sectors arrive from different modem signal processor transmit paths. In an uplink scenario, one embodiment of step 6204 includes parallel steps of synchronizing the signal and providing different types of data for the subsequent processing and transmission. By preprocessing the signal, it is prepared for the scope of processing available to a given hardware design kernel. Following step 6204, flowchart 6200 proceeds to step 6206.

In step 6206 of the present embodiment, a configuration for a configurable element is determined for a given user/channel. As mentioned in step 6104, the configuration can be user/channel specific. Thus, the configuration can include inputs such as radio type 6207*a* or quality of service (QOS) level 6207*b*, to determine the appropriate configuration of the user/channel, or to determine the specific option within an appropriate configuration. Radio type of service 6207*a* can include IS-95B, IS-95C, and IS-2000 as described in TIA/EIA IS2000.2. This input can also include the choice of 3GPP×3.84 MHz Direct-Spread Mode frequency division duplex (FDD) communication protocol. QOS level 6207*b* can be a contracted level of reception quality or optional service features. While specific input types and choices are provided in the present embodiment, the present invention is well suited to using any type of input, and choice therein, as is supported by the design of the configurable device.

Step 6206 is implemented in one embodiment using memory 118, BTS card controller 10*b* of communication device 101 in FIG. 1C, or by using allocator 219 of FIG. 2A and configuration information block 272 of FIG. 2D. In one embodiment, a physical channel can be tied to a specified configuration, and thus established a priori. Alternatively, the data to be processed by the configurable device can contain header information that indicates a protocol, and hence an appropriate configuration for the hardware kernels assigned to process that protocol. Following step 6206, flowchart 6200 proceeds to step 6208.

In step 6208 of the present embodiment, the signal is assigned a data pump path on one or more independent processors. Step 6208 is implemented, in one embodiment, by allocator 219 and/or microprocessor 112 of FIG. 2A, in conjunction with memory. Microprocessor 112 and allocator 219 use a unique set of communication primitives to indicate the data pump path between multiple hardware kernels of which the data is required to flow for data processing that will satiate the desired functions. The information needed for a data pump path includes the hardware kernel addresses from which, and to which, data flows for the required data processing operation. The information also includes any configuration data necessary for the reconfigurable interconnect, e.g., interconnect 204*a* of FIG. 2C, to realize the interconnection of the two or more hardware kernels. The address, instructions, and configuration information (such as reconfigurable interconnect configuration) are stored in memory 118 of communication device 100 of FIG. 1B and/or memory portion of configuration information block 272 or in controller block 271 of a given hardware kernel as shown in FIGS. 2D and 2E.

As an example related to step 6208, several function blocks, e.g., for function group B 316*b* of FIG. 3D, can be implemented on hardware kernel plane 201*a* of FIG. 2C. In particular, hardware kernel group A 268*a* of FIG. 2C can utilize hardware kernels K1 261*a*, K4 264*a*, and K5 265*a*, with the appropriate interconnects between them being established by reconfigurable interconnect 204*a* to implement a given function, or group of functions. The data pump path refers to the hardware kernels used to implement the functions, and the sequence of data flow between these appropriate kernels. Following step 6208, flowchart 6200 proceeds to step 6210.

In step 6210 of the present embodiment, design configuration information is received at a configurable hardware kernel for processing a respective portion of the signal. Step 6210 is implemented, in one embodiment, by receiving design configuration information from configuration information block 272 at satellite kernel 270, within the hardware kernel 261*a*, as shown in FIG. 2D. Alternatively, the memory location of the information can be provided elsewhere, such as a memory portion of allocator 219. This information is downloaded in the present embodiment at start up of the device, following an off-power condition that cleared memory in satellite kernel 270. Alternatively, this information can be reloaded for an interrupt or fault condition, as preset or determined by a user. New configuration information can be received while the device is powered up, thus overriding the previous configuration. Functional block diagram 200*f* shows that control signal generation block 284 provides a configuration information function via communicating the configuration to algorithmic computation block 292 via line 295*d*. Following step 6210, flowchart 6200 proceeds to step 6212.

In step 6212 of the present embodiment, an inquiry determines if time-sharing is occurring. If time-sharing is occurring, then flowchart 6200 proceeds to step 6214. However, if time-sharing is not occurring, then flowchart 6200 skips to step 6216. Step 6212 provides the logic to determine whether a configurable device has a time-share set up or not. The time-share set up requires additional management and memory storage steps, as indicated hereinafter. A configuration input 121 to a communication device can indicate whether time-sharing is used or not, and to what extent it is used. Step 6212 is implemented, in one embodiment, via allocator 219 or processor 112 of FIG. 2A. In particular, allocator 219 or processor 112 can be used to determine whether time-sharing exists, e.g., via pre-programmed timeshare configuration of a channel ID or some other identifier. Furthermore, a configuration design process provides the necessary configuration information and management logistics to implement a time-sharing set up.

Time-sharing, per step 6212, can exist on a wide range of hardware levels. For example, time-sharing can exist on a hardware kernel by hardware kernel basis, e.g., K1 261*a*, or on a hardware plane by hardware plane basis, e.g. hardware kernel plane 201*a*. Furthermore, time-sharing can occur intermittently on a device, as programmed by a user. For example, a device can time-share in terms of temporal variation, e.g., different parts of the day require more or less resources, or spatial diversity, and e.g., some sectors of a base station having higher resource requirements than other sectors. By providing scaled clock speeds to discrete hardware, e.g., hardware kernels, and by providing a selectable quantity of resources, e.g., hardware kernels, the present invention provides effective scalability without significant changes to the architecture. Additional information on timesharing apparatus and processes is described in co-pending patent application entitled "IMPROVED APPARATUS AND METHOD FOR MULTI-THREADED SIGNAL PROCESSING," Ser. No. 09/492,634, and filed on Jan. 27, 2000. This related application is commonly assigned, and is hereby incorporated by reference.

Step 6214 arises if time-sharing is desired, per step 6212. In step 6214 of the present embodiment, the state information for the applicable time slice is received. Step 6214 is implemented, in one embodiment, by retrieving a stored state of configurable computation kernel (or configurable satellite element) 273*a* in a memory portion of controller 271, or in configuration information block 272, of FIG. 2E or 2D respectively. Furthermore, the state of the reconfigurable interconnect 204*a* of FIG. 2C can be stored in memory in allocator 219, as shown in FIG. 2A, or in memory 118 of communication device 100, in another embodiment. The state information is provided to configurable computing element 273*a*. In particular, the type of state information is that required for performing the operation for a given function. Thus, in one embodiment, the states in registers used for filtering can be stored. Likewise, the state of the data being processed can be stored, if the operation was not complete. Following step 6214, flowchart 6200 proceeds to step 6216.

In step 6216 of the present embodiment, the signal is processed by the appropriate configurable elements, e.g., the hardware plane or hardware kernel, etc., as shown in FIGS. 2A through 2F. In practice, after the API functions are executed on the processor per step 6204, control is transferred, e.g., via a handshake protocol, to the pool of reconfigurable kernels, e.g., K1 261*a* through K6 266*a* of FIG. 2C. By transferring control, a lower level of controller now has control within the controller hierarchy system.

Step 6216 is implemented in the present embodiment on one or more hardware kernels, e.g., kernel K1 261*a*, which has autonomous localized control to control an operation to completion. In this manner, the present embodiment provides a data processing island that conserves system resources by performing its operations locally, in a reconfigurable and/or time-share manner. Step 6216 is enabled, in one embodiment, by allocator 219 of FIG. 2A directing the appropriate data signal and control signal to the configurable computation kernel, e.g., configurable computation kernel 273*a*, as described in 'data pump assignment' step 6208. FIG. 2*f* shows the input/output interfaces and functions that enable step 6216. For example, input data 290 is received at algorithmic computation block 292, along with state information 295*b*, and other types of data such as adapted clock signal 295*a* and enable/status 295*c* that enable the algorithmic computation block. The interfaces and functions described in FIG. 2*f* are implemented in hardware in FIGS. 2A through 2F.

In the present embodiment, the functions implemented in step 6216 for communication device 100 of FIG. 1B are the modem functions 6216*a* and the codec functions 6217*b*. In particular, modem functions for a downlink scenario include encoding, interleaving, channelization code mixing, I/Q scrambling code mixing, transmit diversity processing, filtering, and rate-dependent scaling. Modem functions for uplink include: despreading, dechannelization, demodulation, and combining, as programmed by the Layer 1 software stack, including facilities to perform multipath and antenna diversity combining.

In contrast, the codec functions implemented for step 6216 for a downlink scenario include: encoding, interleaving, channelization code mixing, and I/Q scrambling code mixing, transmit diversity processing, filtering, and rate-dependent scaling. The codec functions for uplink scenario include despreading, deinterleaving, channel decoding, assembly of payload data and control information for MTSO. The Data Kernel Specification List, described in Appendix A, provides a more technical description of exemplary discrete sub functions needed to accomplish the modem and codec functions. However, the present invention is well suited to implementing a wide range of functions in a hardware kernel, suitable for a given application. The modem signal processor, under control from the BTS Card Controller, assigns a signal source to a receive-data-pump path in the modem signal processor. The modem signal processor, under control from the BTS Card Controller, assigns a signal source to a receive-data-pump path in the modem signal processor. Following step 6216, flowchart 6200 proceeds to step 6218.

In step 6218 of the present embodiment, the signal is post processed. Thus, after the pool of reconfigurable kernels, e.g., K1 261*a* through K6 266*a* of FIG. 2C, have completed their operations on the data, then control, or computations, are returned back to the processor. Consequently, this completes the circle of hierarchical controls implemented by a return handshake. Step 6218 is implemented, in one embodiment, providing signal to subsequent downstream or upstream functions and devices that prepare the signal for the application, e.g., transmission of a signal via antenna, amplification of a signal for reception, etc. In particular, post processing for a downlink scenario from a BTS can include generating multiplexed I/Q digital base band waveforms identified with a channel, sector, and/or antenna tag. Another post processing step includes formatting the composite signal, consisting of all the signals on a per-carrier and per-sector, as necessary and sent from the channel card to other signal conditioning circuits in the base-station for digital to analog (D/A) conversion and for radio frequency (RF) transmission. Following step 6218, flowchart 6200 ends.

The present embodiment applies flowcharts 6100 and 6200 to a digital wireless communication system. However, the present invention can be applied to a wide range of applications and a wide range of device configurations. Within the wireless communication system described in the present embodiment, the present invention is applicable to mobile units, base stations, and test platforms.

While flowcharts 6100 and 6200 of the present embodiment show a specific sequence and quantity of steps, the present invention is suitable to alternative embodiments. For example, not all the steps provided in flowcharts 6100 and 6200 are required for the present invention. In particular, flowchart 5200 provides steps 5212 and 5214 for a time-share scenario for hardware kernels. However, the time-scenario is optional for the present invention, and thus, these steps may be omitted in one embodiment. Similarly, other steps may be omitted depending upon the application. In contrast, the present invention is well suited to incorporating additional steps to those presented, as required by an application, or as desired for permutations in the process.

Lastly, the sequence of the steps for flowcharts 6100, and 6200 can be modified depending upon the application. Thus, while flowcharts 6100 and 6200 are shown as a single serial process, they can also be implemented as a continuous or parallel process. For example, is appreciated that flowchart 6100 can be repeated for the multiple hardware kernel planes, e.g., plane 201*a* of FIG. 2C, in the multiple processors, e.g., processors 102*a* and 102*b* of FIG. 1B, within a communication device, e.g., device 100.

Many of the instructions for the steps, and the data input and output from the steps, of flowcharts 6100, and 6200 utilize memory and processor hardware components, e.g., memory 118 processor 112 of FIG. 1B. The memory storage used to implement the flowchart steps in the present embodiment can either be permanent, such as read only memory (ROM), or temporary memory such as random access memory (RAM). Memory storage can also be any other type of memory storage, capable of containing program instructions, such as a hard drive, a CD ROM, or flash memory. Similarly, the processor used to implement the flowchart steps can either be a dedicated controller, an existing system processor, or it can be a dedicated digital signal processing (DSP) processor, as appropriate for the type of step. Alternatively, the instructions may be implemented using some form of a state machine.

Some portions of the detailed description, e.g., the processes, are presented in terms of procedures, logic blocks, processing, and other symbolic representations of operations on data bits within a computer or digital system memory or on signals within a communication device. These descriptions and representations are the means used by those skilled in the digital communication arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities.

Usually, though not necessarily, these physical manipulations take the form of electrical or magnetic signals capable of being stored, transferred, combined, compared, and otherwise manipulated in a communication device or a processor. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels to be interpreted further in view of terms commonly used in the art. Unless specifically stated otherwise as apparent from the following discussions, it is understood that throughout discussions of the present invention, terms such as "receiving," "generating," "mapping," "repeating," "identifying," "translating," "dividing, " "decoding," "defining," "time-sharing," "scheduling," "assigning," "creating," "categorizing," "loading," "interfacing," "disassembling," "performing," "synchronizing," "demuxing," "transmitting," "combining," "formatting," "assembling," or the like, refer to the action and processes of a communication device or a similar electronic computing device, that manipulates and transforms data. The data is represented as physical (electronic) quantities within the communication devices components, or the computer system's registers and memories, and is transformed into other data similarly represented as physical quantities within the communication device components, or computer system memories or registers, or other such information storage, transmission or display devices.

In view of the embodiments presented herein, the present invention effectively provides a method and apparatus that can effectively accommodate the increases in the quantity of users and the quantity of data transferred using the limited frequency bandwidth. Furthermore the present invention provides a solution that overcomes the limitations of protocol non-uniformity and proliferation in the wireless communications. The limitations of cost and burden associated with changes in versions or performance levels of a communication protocol are also resolved by the present invention. In an effort to minimize the risks and maximize the rewards, the present invention substantially shortens the lead-time and the investment required for implementing a new specification. Finally, the present invention provides very reasonable power consumption for the communication device.

The foregoing descriptions of specific embodiments of the present invention have been presented for purposes of illustration and description. They are not intended to be exhaustive or to limit the invention to the precise forms disclosed, and naturally, many modifications and variations are feasible in light of the above teaching. The embodiments were chosen and described in order to best explain the principles of the invention and its practical application, to thereby enable those skilled in the art to best utilize the invention and various embodiments with various modifications as is suitable to the particular use contemplated. It is intended that the scope of the invention be defined by the claims appended hereto and their equivalents.

We claim:

1. A method of operating a configurable electronic device with function-specific computing elements to communicate with another electronic device, the method comprising the steps of:
   a) receiving a signal at the configurable electronic device;
   b) assigning a data pump path for the signal in a configurable modem platform of the configurable electronic device, wherein the configurable modem platform includes first and second computing elements and a reconfigurable interconnect;
   c) receiving design configuration information for configuring the configurable modem platform to form a modem architecture to support an applicable communication protocol for the signal, wherein the configuring comprises the steps of:
      c1) selecting and configuring portions of the first and second computing elements for connecting to the reconfigurable interconnect;
      c2) configuring the reconfigurable interconnect to establish applicable connection architecture and connection paths between the first and second computing elements; and
      c3) setting parameters for the first and second computing elements and the configurable interconnect;
   d) performing digital signal processing of a data portion of the signal, using the configurable modem platform, wherein the configurable modem platform has a heterogeneous structure; and
   e) assembling payload data with control information and the configuration information; and
   f) transmitting the payload data, the control information, and the configuration information to a mobile telephone switching office (MTSO).

2. The method recited in claim 1 further comprising the step of:
   disassembling the signal into the data portion, a control portion, and the configuration information using an interface section.

3. The method recited in claim 1 further comprising the step of:
   synchronizing the configurable modem platform with over the air timing.

4. The method recited in claim 1 further comprising the steps of:
   demuxing the signal processed by the configurable modem platform; and
   transmitting the signal from the configurable modem platform for subsequent processing.

5. The method recited in claim 1 further comprising the steps of:
   combining signals to create composite signals on a per-sector and per-carrier basis using an interface section; and
   formatting the composite signal using the interface section.

6. The method recited in claim 1 wherein the digital signal processing in step d) includes performing codec functions using a reconfigurable codec chip having a heterogeneous structure.

7. The method recited in claim 1 wherein the digital signal processing in step d) includes performing modem functions using a reconfigurable modem chip having a heterogeneous structure.

8. The method recited in claim 1 further comprising the steps of:
   determining whether the configurable modem platform is time-sharing; and
   if the configurable modem platform is time-sharing, receiving state information for an applicable time slice.

9. A system for operating a configurable electronic device with function-specific computing elements to communicate with another electronic device, comprising:
   first receiving means for receiving a signal at the configurable electronic device;
   assigning means for assigning a data pump path for the signal in a configurable modem platform of the configurable electronic device, wherein the configurable modem platform includes first and second computing elements and a reconfigurable interconnect;

second receiving means for receiving design configuration information and including a receiving means for configuring the configurable modem platform to form a modem architecture to support an applicable communication protocol for the signal, wherein the receiving means comprises:

selecting and configuring means for selecting and configuring portions of the first and second computing elements for connecting to the reconfigurable interconnect;

configuring means for configuring the reconfigurable interconnect to establish applicable connection architecture and connection paths between the first and second computing elements; and setting means for setting parameters for the first and second computing elements and the configurable interconnect;

digital signal processing means for processing a data portion of the signal, using the configurable modem platform, wherein the configurable modem platform has a heterogeneous structure;

assembling means for assembling payload data with control information and the configuration information; and transmitting means for transmitting the payload data, the control information, and the configuration information to a mobile telephone switching office (MTSO), wherein digital signal processing means includes means for performing modem functions using a reconfigurable modem chip having a heterogeneous structure.

10. The system recited in claim 9, further comprising:
disassembling means for disassembling the signal into the data portion, a control portion, and the configuration information using an interface section.

11. The system recited in claim 9 further comprising:
synchronizing means for synchronizing the configurable modem platform with over the air timing.

12. The system recited in claim 9, further comprising:
demuxing means for demuxing the signal processed by the configurable modem platform; and
transmitting means for transmitting the signal from the configurable modem platform for subsequent processing.

13. The system recited in claim 9, further comprising:
combining means for combining signals to create composite signals on a per-sector and per-carrier basis using an interface section; and
formatting means for formatting the composite signal using the interface section.

14. The system recited in claim 9, wherein the digital signal processing means includes means for performing codec functions using a reconfigurable codec chip having a heterogeneous structure.

15. The method recited in claim 9, further comprising:
means for determining whether the configurable modem platform is time-sharing; and
third receiving means for receiving, if the configurable modem platform is time-sharing, state information for an applicable time slice.

16. A system for operating a configurable electronic device with function-specific computing elements to communicate with another electronic device, the system comprising:
a processor;
a memory communicatively coupled to the processor; and
software executing in the processor configured to:
a) receive a signal at the configurable electronic device;
b) assign a data pump path for the signal in a configurable modem platform of the configurable electronic device, wherein the configurable modem platform includes first and second computing elements and a reconfigurable interconnect;
c) receive design configuration information for configuring the configurable modem platform to form a modem architecture to support an applicable communication protocol for the signal, wherein the configuring comprises:
c1) selecting and configuring portions of the first and second computing elements for connecting to the reconfigurable interconnect;
c2) configuring the reconfigurable interconnect to establish applicable connection architecture and connection paths between the first and second computing elements; and
c3) setting parameters for the first and second computing elements and the configurable interconnect;
d) perform digital signal processing of a data portion of the signal, using the configurable modem platform, wherein the configurable modem platform has a heterogeneous structure;
e) assemble payload data with control information and the configuration information; and
f) transmitting the payload data, the control information, and the configuration information to a mobile telephone switching office (MTSO).

17. A computer program having a program code for performing the method for operating a configurable electronic device with function-specific computing elements to communicate with another electronic device, comprising the steps of:
a) receiving a signal at the configurable electronic device;
b) assigning a data pump path for the signal in a configurable modem platform of the configurable electronic device, wherein the configurable modem platform includes first and second computing elements and a reconfigurable interconnect;
c) receiving design configuration information for configuring the configurable modem platform to form a modem architecture to support an applicable communication protocol for the signal, wherein the configuring comprises the steps of:
c1) selecting and configuring portions of the first and second computing elements for connecting to the reconfigurable interconnect;
c2) configuring the reconfigurable interconnect to establish applicable connection architecture and connection paths between the first and second computing elements; and
c3) setting parameters for the first and second computing elements and the configurable interconnect;
d) performing digital signal processing of a data portion of the signal, using the configurable modem platform, wherein the configurable modem platform has a heterogeneous structure;
e) assembling payload data with control information and the configuration information; and
f) transmitting the payload data. the control information, and the configuration information to a mobile telephone switching office (MTSO),
when the computer program runs on a computer.

* * * * *

UNITED STATES PATENT AND TRADEMARK OFFICE
CERTIFICATE OF CORRECTION

| | |
|---|---|
| PATENT NO. | : 7,254,649 B2 |
| APPLICATION NO. | : 11/198692 |
| DATED | : August 7, 2007 |
| INVENTOR(S) | : Ravi Subramanian et al. |

It is certified that error appears in the above-identified patent and that said Letters Patent is hereby corrected as shown below:

In the Specification:

At column 12: line 35: "164," should read --164-- line 36: "interconnect" should read --interconnects--

At column 13: line 56: "is removes" should read --it removes--

At column 15: line 65: "liens" should read --lines--

At column 16: line 17: "buses" should read --bus--

At column 18: line 16: "inefficiently" should read --inefficiency--

At column 22: line 2: "architecture is used in" should read --architecture in--

At column 23: line 3: "accordance" should read --in accordance--

At column 26: line 53: "provide" should read --provides--

At column 33: line 40: "across a multiple" should read --across multiple--

At column 35: line 9: "functions" should read --function--

At column 37: line 65: "on communication" should read --on a communication--

At column 42: line 36: "example, is" should read --example, it is--

UNITED STATES PATENT AND TRADEMARK OFFICE
CERTIFICATE OF CORRECTION

PATENT NO. : 7,254,649 B2
APPLICATION NO. : 11/198692
DATED : August 7, 2007
INVENTOR(S) : Ravi Subramanian et al.

It is certified that error appears in the above-identified patent and that said Letters Patent is hereby corrected as shown below:

At column 43: line 54: "as is suitable" should read --as are suitable--

Signed and Sealed this

Thirtieth Day of October, 2007

JON W. DUDAS
*Director of the United States Patent and Trademark Office*